(12) United States Patent
Learnard

(10) Patent No.: US 8,499,671 B2
(45) Date of Patent: Aug. 6, 2013

(54) PANEL SAW

(76) Inventor: Stanley Learnard, Brunswick, MD (US)

( * ) Notice: Subject to any disclaimer, the term of this patent is extended or adjusted under 35 U.S.C. 154(b) by 909 days.

(21) Appl. No.: 12/455,858

(22) Filed: Jun. 8, 2009

(65) Prior Publication Data

US 2010/0037742 A1 Feb. 18, 2010

Related U.S. Application Data

(63) Continuation-in-part of application No. 11/231,504, filed on Sep. 21, 2005, now abandoned.

(60) Provisional application No. 60/611,827, filed on Sep. 21, 2004.

(51) Int. Cl.
*B27B 5/18* (2006.01)
*B26D 1/18* (2006.01)
*B26D 7/01* (2006.01)

(52) U.S. Cl.
USPC .............. 83/485; 83/471.2; 83/468; 83/468.7

(58) Field of Classification Search
USPC ................ 83/485, 467.1–468.94, 486, 486.1, 83/471.2, 471.3; 269/304; 144/286.1, 287
See application file for complete search history.

(56) References Cited

U.S. PATENT DOCUMENTS

| | | | | |
|---|---|---|---|---|
| 2,741,277 A * | 4/1956 | Leger | | 83/368 |
| 2,973,020 A * | 2/1961 | Bennett | | 83/471.3 |
| 2,992,662 A * | 7/1961 | Heffern | | 83/471.2 |
| 3,008,498 A * | 11/1961 | Olson | | 144/250.18 |
| 3,139,124 A * | 6/1964 | Hoff | | 83/564 |
| 3,695,189 A * | 10/1972 | Felder, Jr. | | 108/65 |
| 3,866,496 A * | 2/1975 | Payne et al. | | 83/471.3 |
| 4,068,551 A * | 1/1978 | Kreitz | | 83/471.3 |
| 4,150,597 A * | 4/1979 | Striebig | | 83/471.3 |
| 4,341,247 A * | 7/1982 | Price | | 144/287 |
| 4,802,399 A * | 2/1989 | Olson | | 83/425 |
| 5,582,088 A * | 12/1996 | Harter | | 83/468.4 |
| 5,768,966 A * | 6/1998 | Duginske | | 83/468.7 |
| D404,405 S * | 1/1999 | Hammett et al. | | D15/133 |
| 7,047,856 B2 * | 5/2006 | Nurenberg et al. | | 83/471.3 |
| 7,779,737 B2 * | 8/2010 | Newman et al. | | 83/485 |
| 2007/0029011 A1 * | 2/2007 | Thatcher | | 144/286.5 |

* cited by examiner

*Primary Examiner* — Laura M. Lee
(74) *Attorney, Agent, or Firm* — Dennis H. Lambert

(57) ABSTRACT

A supplemental frame and adjustable edge stop assembly are mounted to a front lower edge of a panel saw. A first quick release mount on the supplemental frame cooperates with a second quick release mount on the edge stop assembly to enable quick interchange of assemblies. One form of edge stop assembly includes a movable panel for movement as a unit of multiple edge stops into and out of operative position. A mounting plate for a cutting tool has workpiece rise limiters for pressing the workpiece against the panel saw face. Adjustable hold-downs engage a top edge of the workpiece to hold it down against support rollers. The edge stops, rise limiters and hold-downs form a pocket supporting the workpiece along three mutually perpendicular axes. A stand-off panel removably positioned on a front face of the panel saw supports thin workpieces closer to the cutting tool.

12 Claims, 24 Drawing Sheets

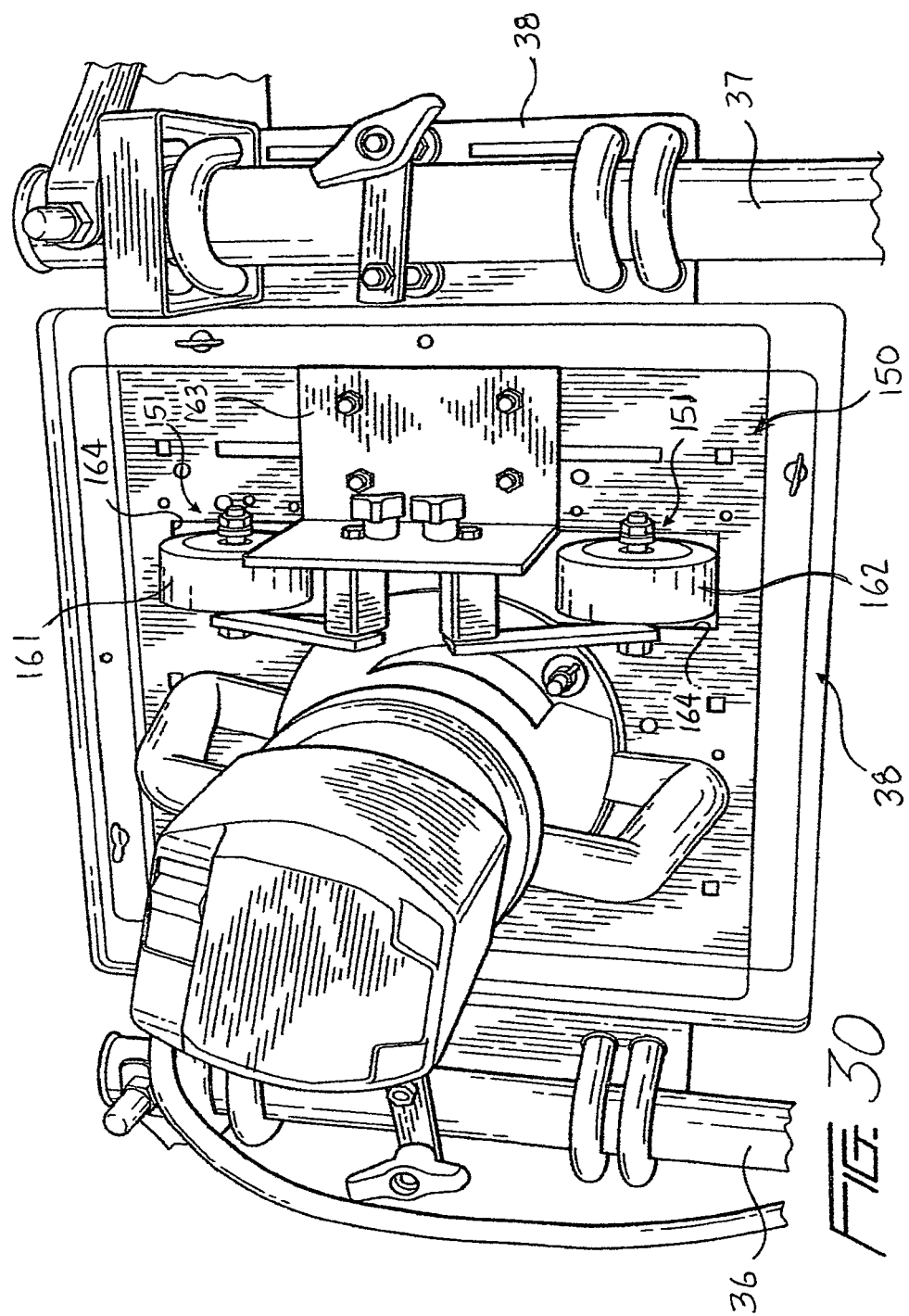

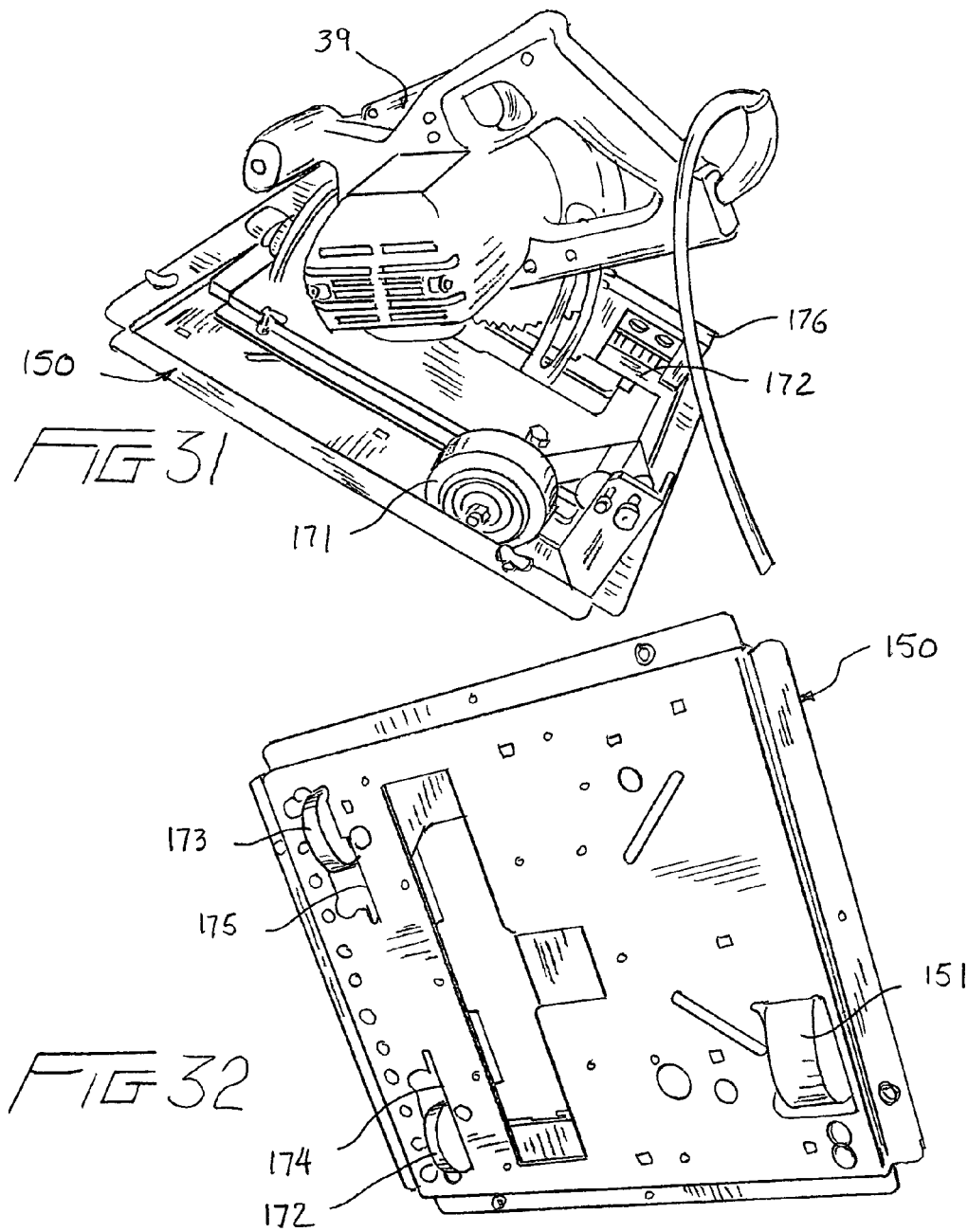

PANEL SAW

REFERENCE TO RELATED APPLICATIONS

This application is a continuation-in-part of U.S. patent application Ser. No. 11/231,504, filed Sep. 21, 2005 now abandoned, which in turn claims the benefit of U.S. provisional patent application Ser. No. 60/611,827, filed Sep. 21, 2004.

TECHNICAL FIELD

This invention relates to panel saws. More particularly, the invention relates to attachments and modifications to panel saws to improve performance and facilitate ease of use, especially for repetitive cuts and multiple cuts at a particular spacing.

BACKGROUND ART

Panel saws are known in the prior art for supporting and cutting large pieces of material, such as sheets of plywood, for example. Conventional panel saws comprise a frame that typically rests on a floor surface, and presents a front face that usually is slightly inclined from vertical, i.e., leans back away from the operator. Roller supports near the bottom of the front of the frame are spaced along the length of the frame for supporting the workpiece, such as a 4×8 sheet of plywood, for example, so that the workpiece leans back against the face of the frame and can be moved longitudinally on the frame. A circular saw, router, or other tool is mounted on the frame generally centrally of its length for up and down movement relative to the frame and thus relative to a workpiece supported on the frame for cutting, routing, or performing another cutting operation on the workpiece.

In use, a sheet of material to be cut, routed or otherwise treated is placed on the frame with the bottom edge of the workpiece resting on the rollers. If a vertical cut is to be made in the workpiece, the saw or other tool is moved along its support slides to an elevated position above the top edge of the workpiece. The workpiece is then moved longitudinally on the frame to a predetermined position for cutting a desired length or width of the workpiece from the sheet, and the tool is then turned on and moved downwardly on its slide supports to engage and cut the workpiece. Many conventional panel saws also enable the cutting tool to be positioned and held in a desired location spaced from the top or bottom of the frame, and oriented so that a horizontal cut or the like can be made in the workpiece as the workpiece is moved longitudinally past the tool.

The use of a panel saw frame to hold and support the work, and to hold and guide the tool, enables large workpieces to be more easily cut, and accurate and repetitive cuts or other operations can be relatively easily made. To enhance these functions, conventional panel saws can be provided with measuring tapes or devices that are mounted to the panel saw frame in a position to provide an indication of the position of the workpiece, and adjustable stops can be provided for engaging an edge of the workpiece to locate and hold the workpiece in a particular position while a cut or other operation is being performed on it. Spring rise limiters also are sometimes mounted on the frame to press rearwardly against the face of thinner workpieces to hold them against the frame and prevent undesired movement or "chatter" of the workpiece as an operation is being performed on it.

While conventional panel saws greatly facilitate the ease and convenience of cutting or performing other operations on large workpieces, such as 4×8 sheets of plywood, for example, they lack sturdiness and versatility in some of the attachments, such as edge stops, hold downs, rise limiters, and the like, that are provided for attachment to the panel saw to enhance its functionality.

Applicant's prior copending application Ser. No. 11/231,504 describes several improvements to conventional panel saws that minimize or eliminate the disadvantages of conventional panel saws as described above. Applicant's modified panel saw has improved attachments that engage the top edge, bottom edge, trailing edge, back surface and front surface of a workpiece, forming a pocket that limits movement of the workpiece along three mutually perpendicular axes. The improved attachments include a stand-off panel that can be mounted on the face of a panel saw frame to position the workpiece closer to the cutting tool, and interchangeable light duty and heavy duty edge stop assemblies. The light duty and heavy duty edge stops are respectively carried on separate edge stop guide assemblies that must be removed and replaced on the panel saw when it is desired to replace one type of edge stop with another. The edge stops in applicant's prior application are individually adjustable longitudinally relative to the workpiece, but they are all held in a fixed position in a direction perpendicular to the face of the workpiece and in order to place them in or remove them from operative service the entire edge stop assembly must be removed from the panel saw frame.

Accordingly, there is need for a panel saw that has performance-enhancing attachments that are sturdy and versatile in their use, and wherein heavy duty edge stops may be placed into and removed from service without requiring removal and replacement of the light duty edge stops or of the entire edge stop assembly. Further, there is need for an edge stop assembly that enables all the edge stops to be moved as a unit into and out of operative position.

DISCLOSURE OF THE INVENTION

The present invention comprises a panel saw having sturdy and versatile performance-enhancing attachments. In particular, according to one aspect of the invention a supplemental frame structure is mounted to a lower front portion of a conventional panel saw frame for selectively supporting different types of edge stops upstream and/or downstream of the tool, and for supporting a measuring tape in a position closer to the operator and in a position to cooperate with the edge stops. The different types of edge stops include heavy duty pivoting edge stops that are pivoted into position behind the trailing edge of large heavy workpieces, and lighter duty gravity or spring operated edge stops that automatically move into position behind the trailing edge of smaller and lighter workpieces as the workpiece is advanced past the stops. Both types of edge stop are carried on a guide means that positions the stops close to the workpiece and enables them to be adjusted longitudinally relative to the workpiece.

In one form of the invention a stationary edge stop assembly is mounted in fixed spaced relation to the face of the panel saw and workpiece, and edge stops are carried on guide means on the assembly for adjustable movement longitudinally relative to the workpiece. Either heavy duty or light duty edge stops may be placed on the guide means in substitution for one another. In a preferred embodiment heavy duty edge stops may be positioned on the guide means to overlie light duty edge stops already mounted on the guide means, rendering the light duty edge stops inoperative and the heavy duty edge stops operative without requiring removal of an entire edge stop assembly or removal of the light duty edge stops from the assembly.

In a preferred embodiment of the invention a plurality of edge stops are carried on a guide means mounted to a slide plate that is movable toward and away from the face of the workpiece to move the edge stops as a unit either in a position to operatively engage an edge of the workpiece or in a position spaced from the workpiece and therefore inoperative.

In a further preferred embodiment the guide means comprises a pair of spaced guide rails extending parallel to and spaced from the face of the panel saw frame, with light duty edge stops carried by the rail closest to the panel saw frame, and heavy duty edge stops mounted on the remote rail. When the heavy duty edge stops are pivoted into operative position to overlay the lighter duty edge stops they render the light duty stops inoperable, effectively substituting heavy duty edge stops for light duty edge stops without requiring their removal and replacement on the edge stop assembly. Thus, the edge stop assembly can be converted from light duty edge stops to heavy duty edge stops, and vice versa, simply by placing heavy duty edge stops on the guide rail or removing them therefrom.

The edge stop assembly is releasably carried by a supplemental frame attached to a lower front edge of the panel saw frame, whereby the edge stop assembly may be detached from the frame to move it out of the way if desired.

In accordance with another aspect of the invention, a removable stand-off panel is provided for placement against the face of a conventional panel saw frame for locating thin workpieces closer to the tool. In one embodiment, this stand-off panel includes a plurality of recessed channel members that carry adjustable hold-downs for engaging an upper edge of a workpiece supported on the panel saw frame to hold the workpiece down against undesired vertical upward movement on the frame while an operation is being performed on the workpiece.

In accordance with a further aspect of the invention, manual and/or spring operated rise limiters are mounted on the tool carriage to engage and hold the workpiece back against the frame to prevent it from lifting forwardly away from the frame while an operation is being performed on the workpiece by the tool. In a preferred embodiment, a rise limiter is provided on each side of the tool, with one rise limiter additionally located to contact the work in advance of the tool, and the other rise limiter located to contact the work after it is contacted by the tool.

In accordance with a still further aspect of the invention, a piece of wood or similar material is placed in the channel behind the path of movement of the tool, to provide a back support for the work in that area.

BRIEF DESCRIPTION OF THE DRAWINGS

The foregoing, as well as other objects and advantages of the invention, will become apparent from the following detailed description when taken in conjunction with the accompanying drawings, wherein like reference characters designate like parts throughout the several views, and wherein:

FIG. 30 is a fragmentary front perspective view of the tool carriage, tool mounting plate, associated carriage slides, and a first form of spring loaded rise limiter carried by the tool mounting plate, wherein the tool shown in this figure is a router.

FIG. 31 is a top perspective view of a tool mounting plate with a circular saw mounted to it, shown removed from the tool carriage, and showing a variation of the spring loaded rise limiter mounted to the plate.

FIG. 32 is a bottom perspective view of the assembly of FIG. 31.

DETAILED DESCRIPTION OF THE PREFERRED EMBODIMENTS

Figure 1:
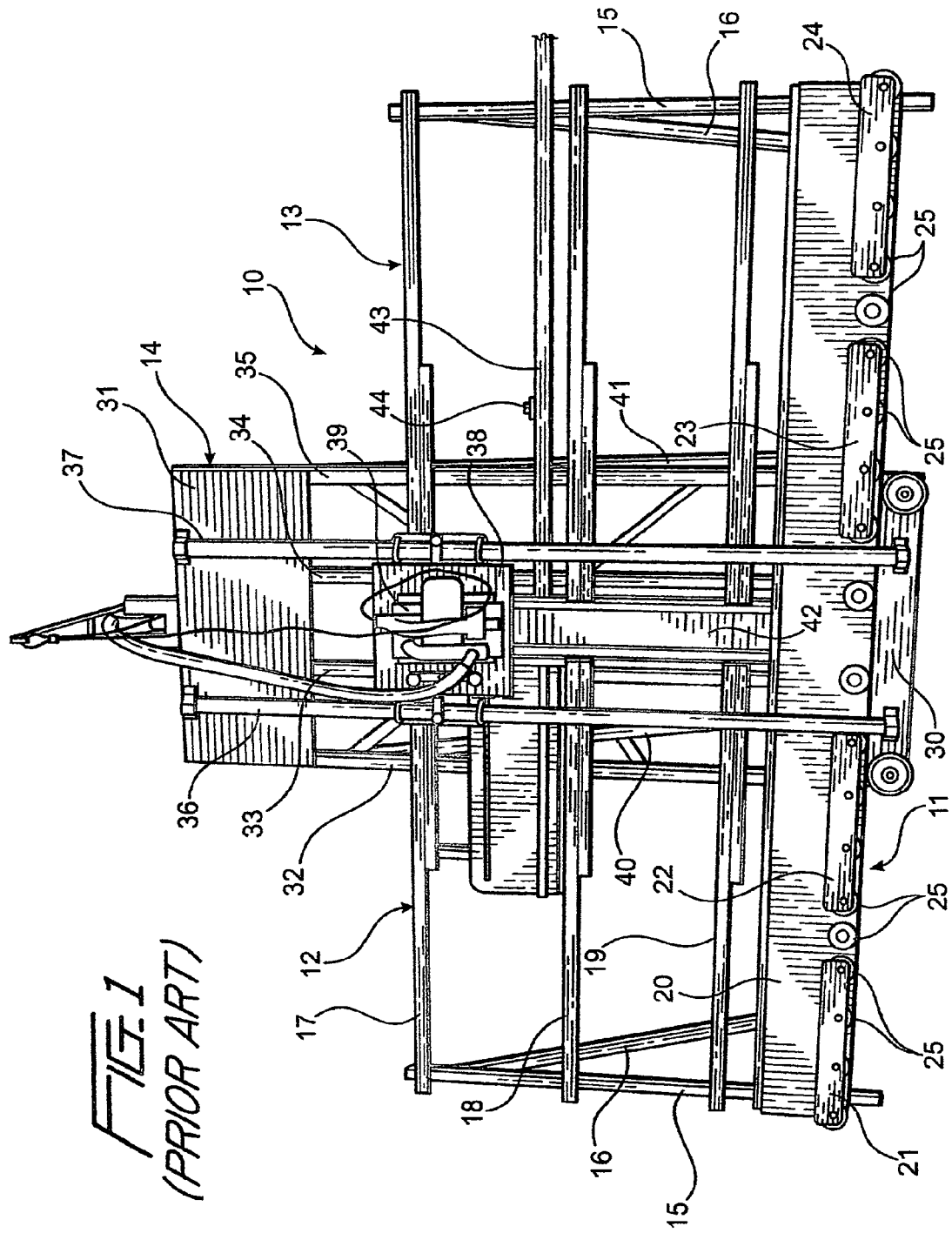
FIG. 1 is a top, front perspective view of a conventional panel saw.

A conventional panel saw assembly is shown at 10 in FIG. 1. The panel saw comprises a frame 11 having laterally outwardly extending wings 12 and 13, and a center section 14. The wings are supported at their outer ends by angularly disposed legs 15 and 16, and comprise a plurality of parallel, horizontally extending frame bars 17, 18 and 19, and a base panel 20 with a plurality of guide plates 21, 22, 23 and 24 supported in spaced, axially aligned relationship outwardly of the panel 20. Workpiece support rollers 25 are rotatably mounted along the front or face of the panel 20 at its bottom edge, with some of the rollers positioned between the guide plates and the base panel.

The center section 14 comprises a base member 30 and a top plate 31, with a plurality of generally vertically extending bars 32, 33, 34 and 35 extending between them. A pair of spaced apart, parallel tool carriage guide rods 36 and 37 extend between the base member and the top plate for supporting and guiding a tool carriage 38 having mounted thereon a suitable tool, e.g., a circular saw 39, or router or the like (not shown). Downwardly divergent support legs 40 and 41 are connected to the upper ends of the outermost vertically extending bars 32 and 35. The horizontally extending frame bars 17, 18 and 19 are interrupted between the two vertical center section bars 33 and 34, and a generally vertically extending channel member 42 is mounted in this space, behind the tool carriage, providing a clearance space for the tool as it is moved downwardly to make a cut in the workpiece. A horizontally extending bar 43 is mounted to one of the wing frames, and carries an adjustable stop 44. In addition, a tape measure (not seen) typically is positioned on top of the bar 43.

In use, a workpiece, e.g., a sheet of material (not shown) such as a sheet of plywood, fiberboard, or other material commonly cut on a panel saw is placed on the frame at one of the wings 12, with the bottom edge of the workpiece resting on the rollers 25 and retained between the guide plates 21, 22, 23 and 24 and the base panel 20, with the workpiece lying back against the face of the frame defined by the horizontally extending members 17, 18 and 19. The tool 39 is elevated to a position higher than the workpiece, which is then moved longitudinally on the rollers until it extends past the tool a predetermined distance. The tool is then turned on and moved down on its guides 36 and 37 across the sheet of material to cut it or perform some other desired operation, such as scoring or routing.

Figure 2:
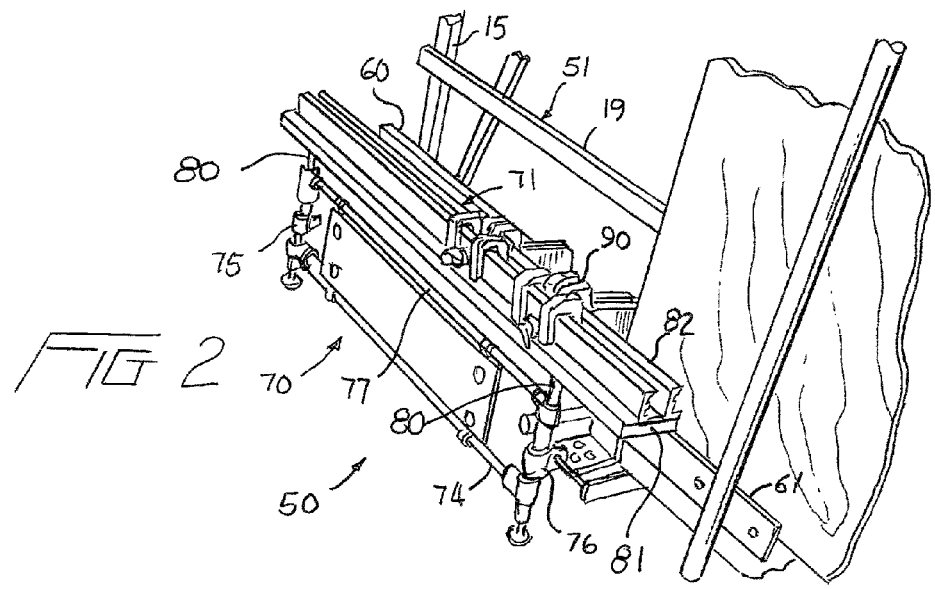
FIG. 2 is a fragmentary, top, front perspective view of a panel saw incorporating some of the enhancement features of the invention, including the supplemental frame and a first form of edge stop assembly according to the invention.
Figure 3:
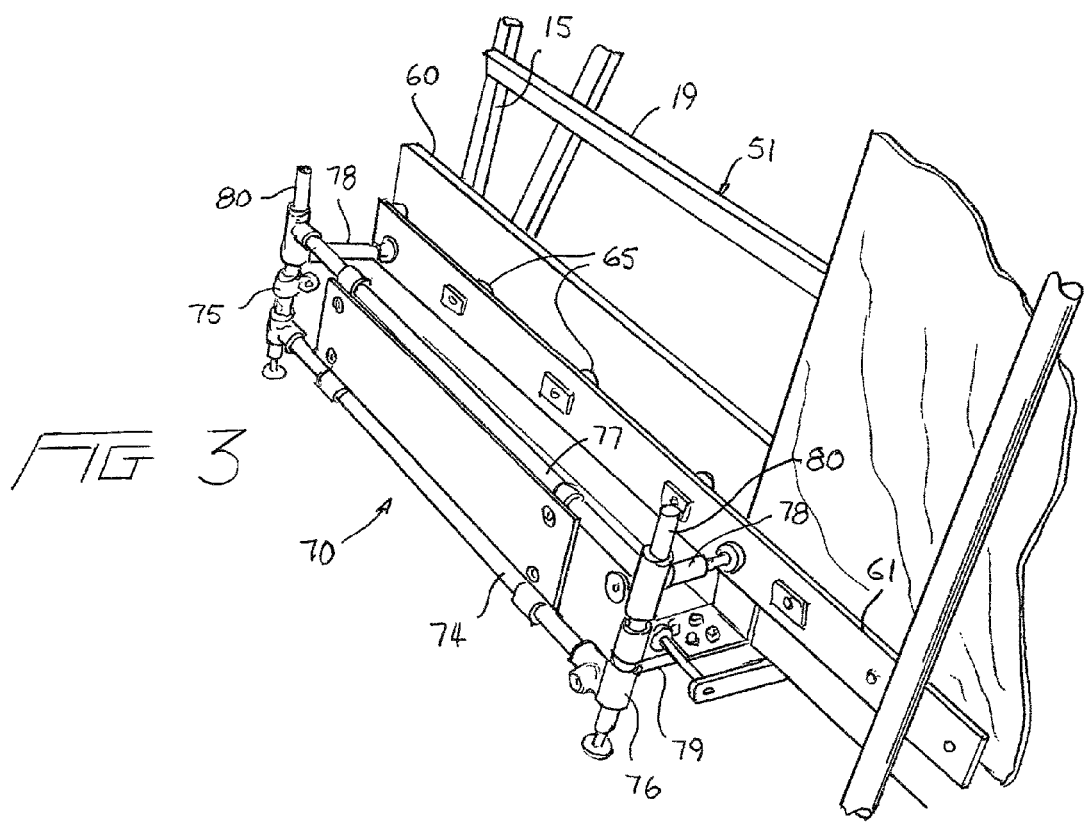
FIG. 3 is a fragmentary top perspective view similar to FIG. 2, but with the edge stop assembly removed from the supplemental frame.

The panel saw according to the invention is indicated generally at 50 in FIGS. 2 and 3 and comprises a frame structure 51 that is generally the same as that described above. That is, it comprises a pair of laterally extending wings and a center section. As in the conventional panel saw frame, the wings each include a plurality of parallel, horizontally extending frame bars, only one of which is shown at 19, generally vertically extending frame supports at the outer ends of the wings, only one of which is shown at 15, and a base panel 60 with a guide plate 61 supported in spaced relationship outwardly of the panel 60. Rollers 65 are rotatably mounted along the front or face of the panel 60 at its bottom edge, with some of the rollers positioned between the guide plate and the panel.

Figure 4:
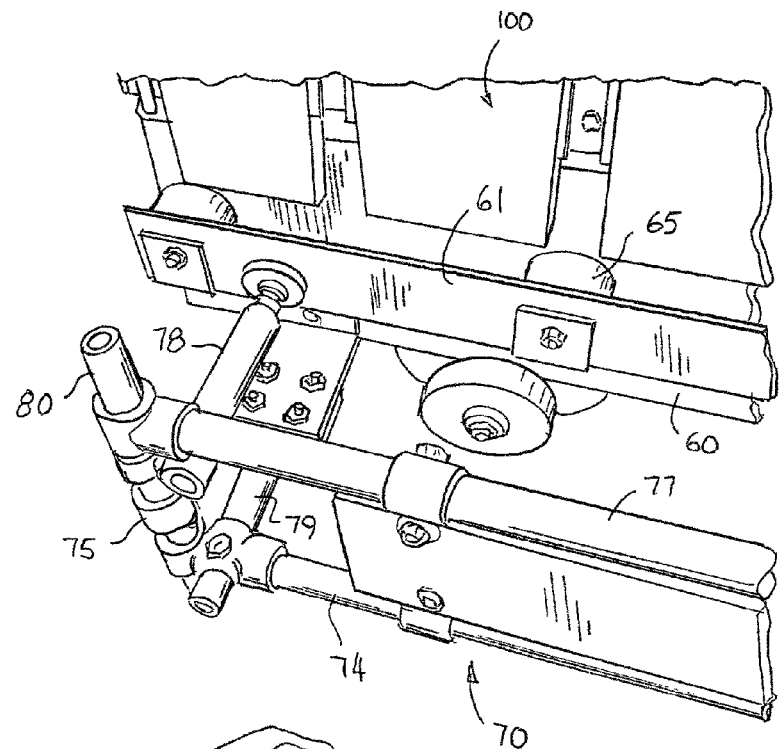
FIG. 4 is an enlarged fragmentary top perspective view of a portion of the supplemental frame shown in FIG. 3.
Figure 6:
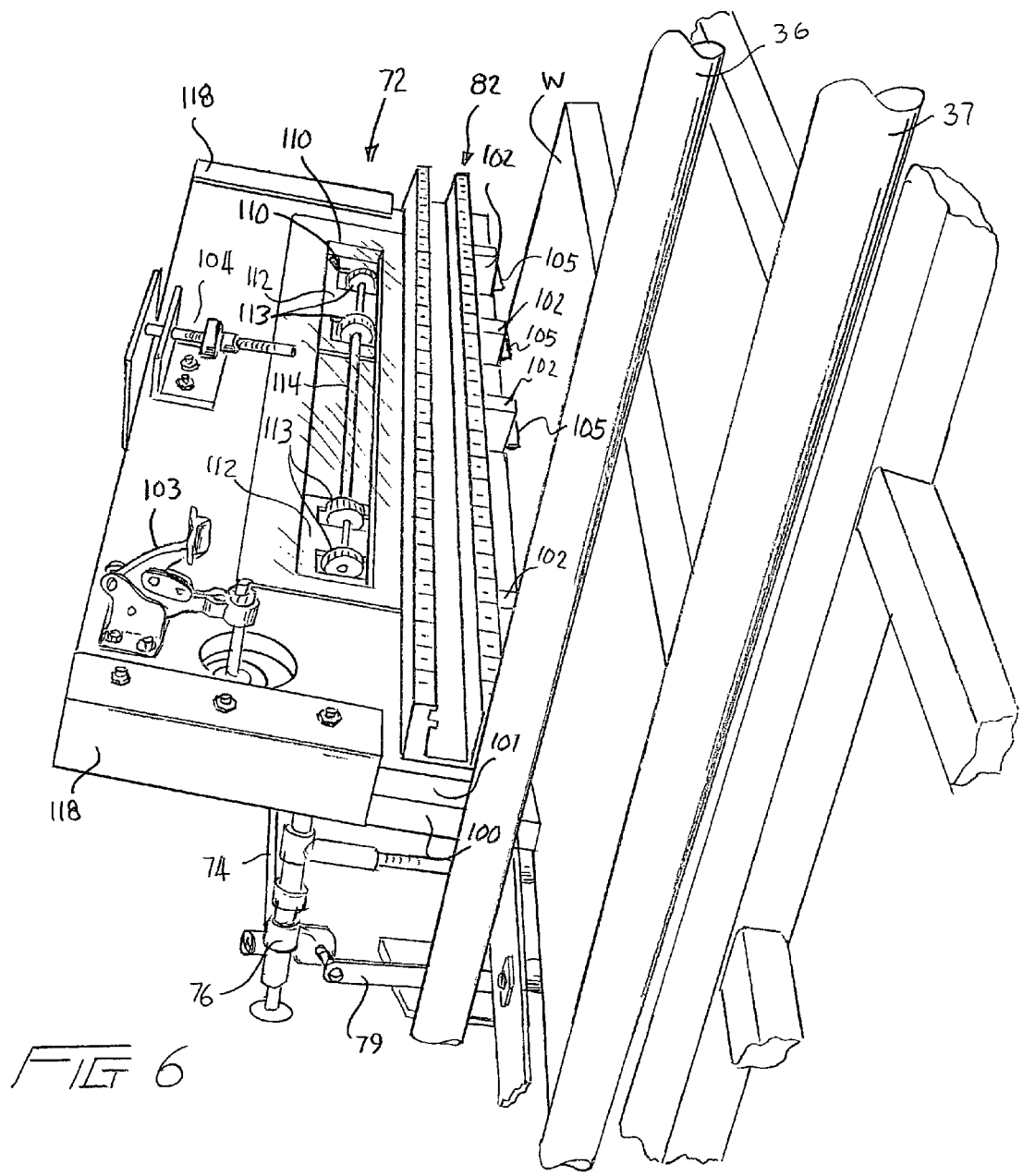
FIG. 6 is an enlarged fragmentary top perspective view of a second form of edge stop assembly according to the invention, wherein a plurality of edge stops are carried by a movable plate that is adjustable in a direction toward and away from the face of the workpiece, and showing the movable plate locked in a retracted position spaced from the workpiece, rendering the edge stops inoperative.

The present invention differs from the prior art primarily in the following aspects:

(1) A supplemental frame assembly 70 is mounted to a bottom edge portion of at least one of the wings, and interchangeable edge stop assemblies 71 (see FIG. 2) and 72 (see FIGS. 6 and 7) are removably mounted on the supplemental frame assembly;

(2) The supplemental frame has a first quick release mounting means 80 on an upper end thereof (see FIGS. 3 and 4);

(3) The edge stop assemblies each comprise an edge stop support means (81 in FIGS. 2 and 22, 100, 101 in FIG. 6) having a second quick release mounting means 92 on an underside thereof and on which is supported a plurality of adjustable edge stops (90 in FIG. 2, 102 in FIG. 6).

Figure 19:
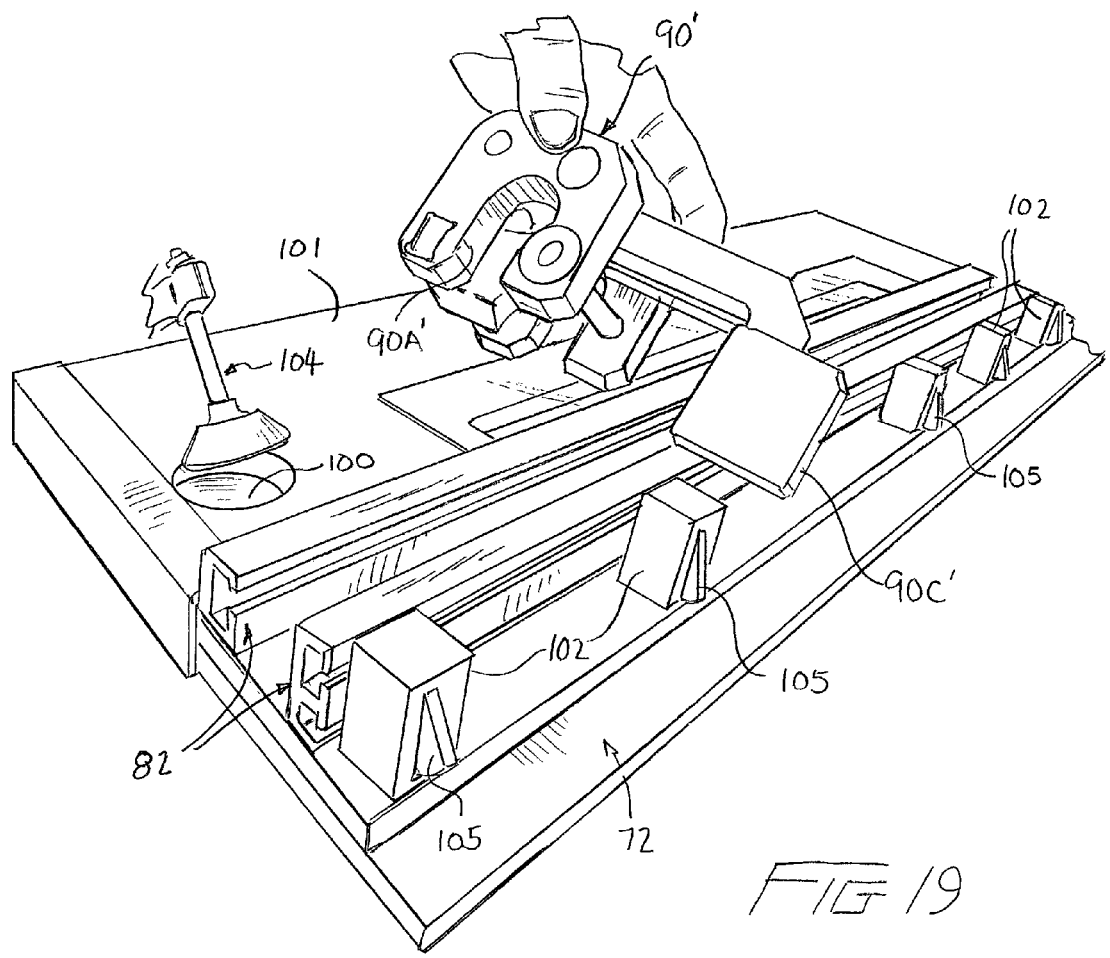
FIG. 19 is an enlarged, fragmentary top perspective view of the edge stop assembly of FIGS. 6 and 7, with a plurality of light duty edge stops carried by the guide means and a heavy duty edge stop about to be positioned in overlying relationship to a light duty edge stop to render the light duty edge stop inoperative and place the heavy duty edge stop in service.
Figure 20:
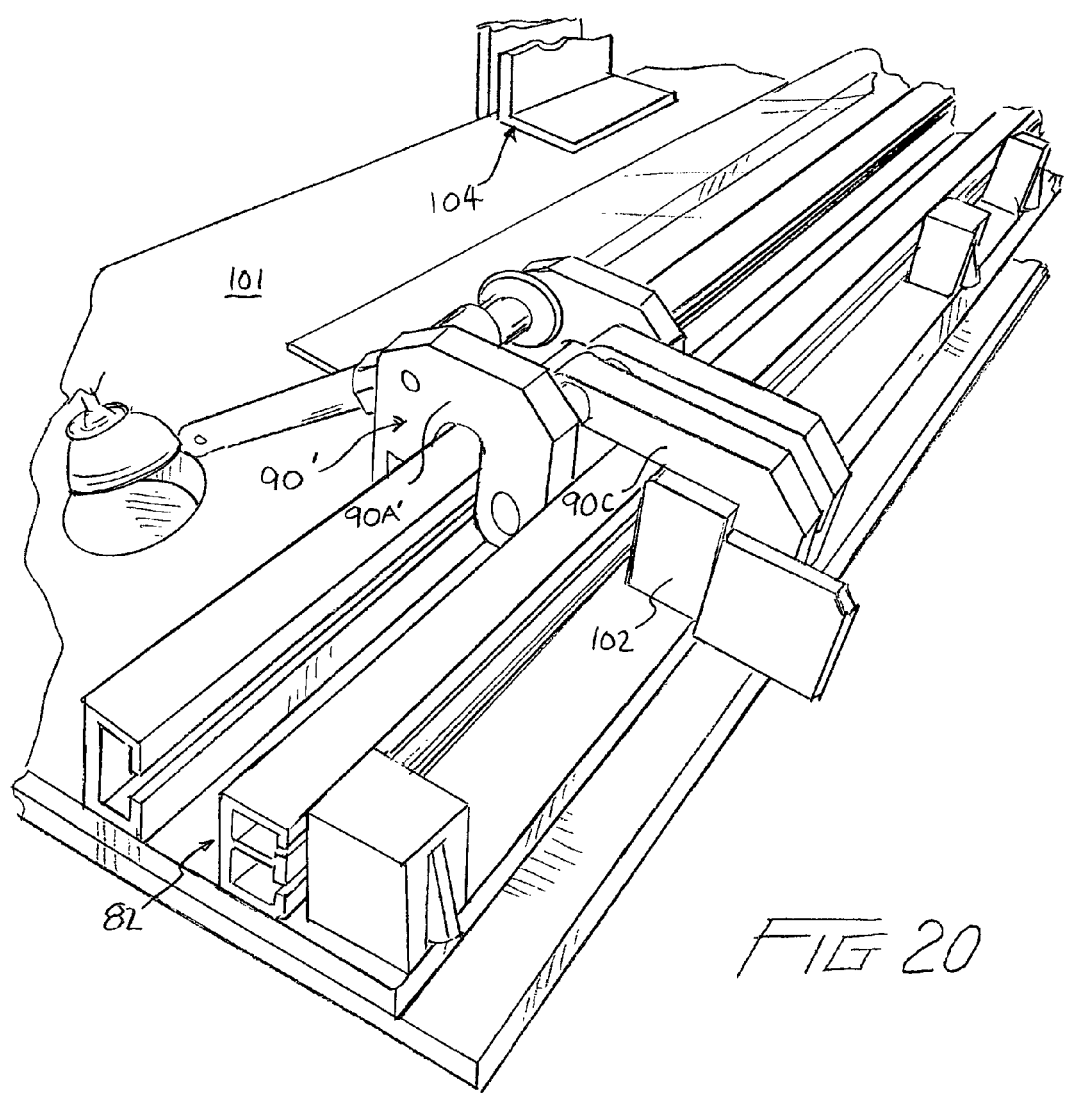
FIG. 20 is an enlarged fragmentary top perspective view of the edge stop assembly of FIG. 19, showing the heavy duty edge stop in operative position over a light duty edge stop.
Figure 21:
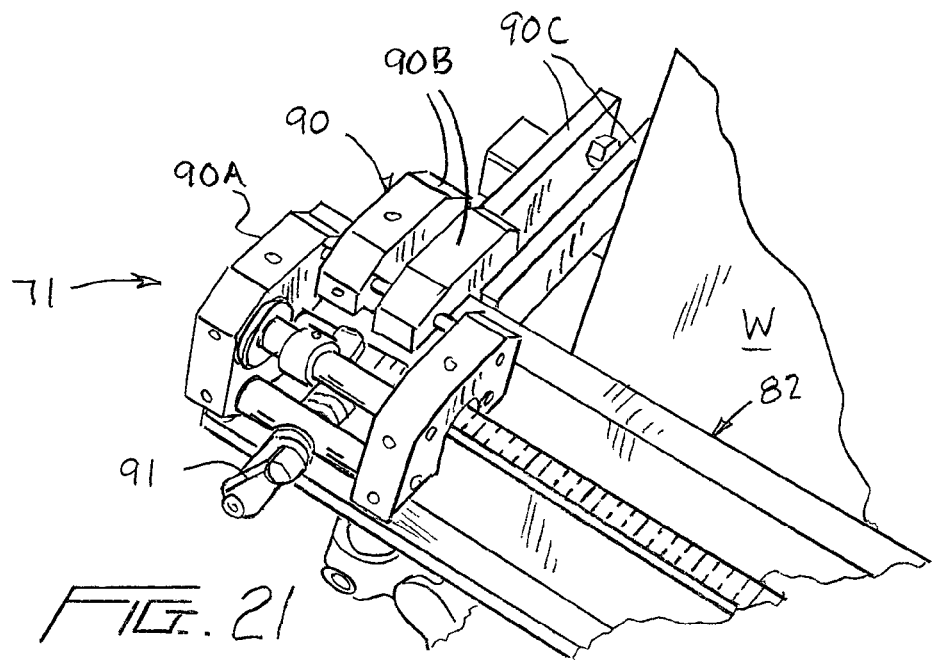
FIG. 21 is a greatly enlarged, fragmentary top perspective view of a heavy duty edge stop according to the invention, shown in operative position pivoted into engagement with the trailing edge of a workpiece.
Figure 22:
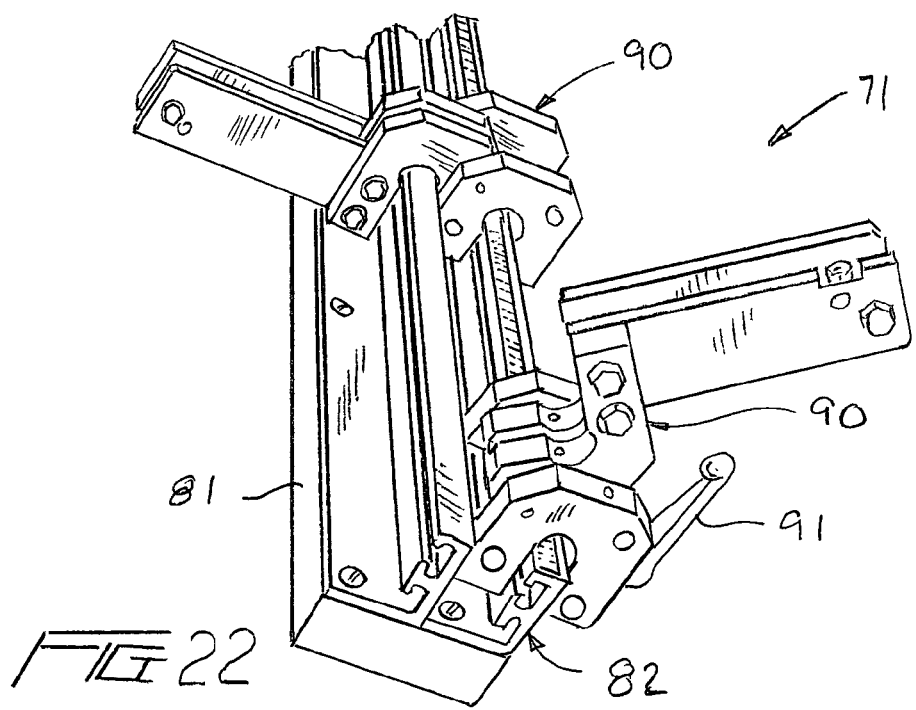
FIG. 22 is a greatly enlarged, fragmentary top perspective view of a pair of heavy duty edge stop assemblies according to the invention mounted on a first form of guide means, and showing one of the edge stops pivoted up into an inoperative position and the other edge stop pivoted down into an operative position.
Figure 23:
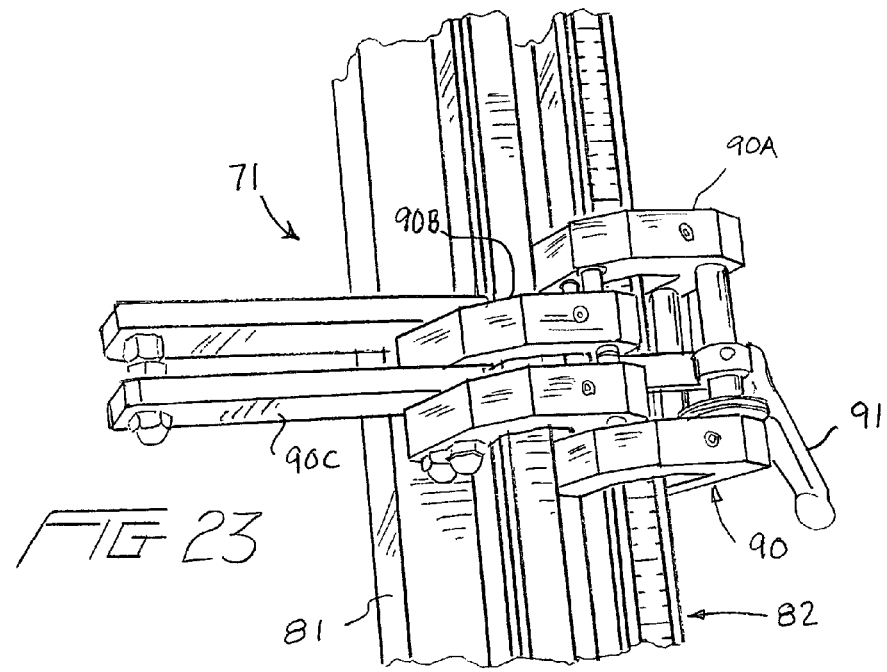
FIG. 23 is a further enlarged, fragmentary top perspective view of one of the heavy duty edge stops of the invention, showing further details of the edge stop.
Figure 24:
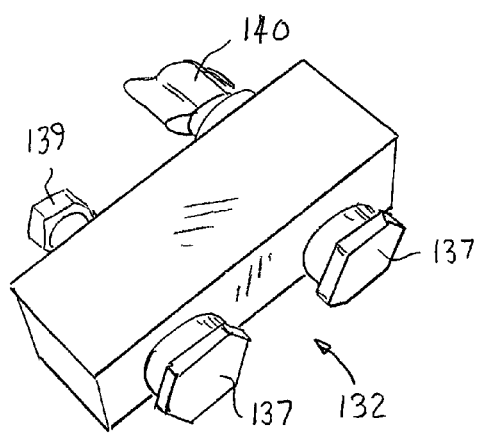
FIG. 24 is a top perspective view of one of the hold-down blocks of the invention that are adjustable moveable vertically on the stand-off panel to engage an upper edge of a workpiece and hold it down on the support rollers of the panel saw frame.
Figure 25:
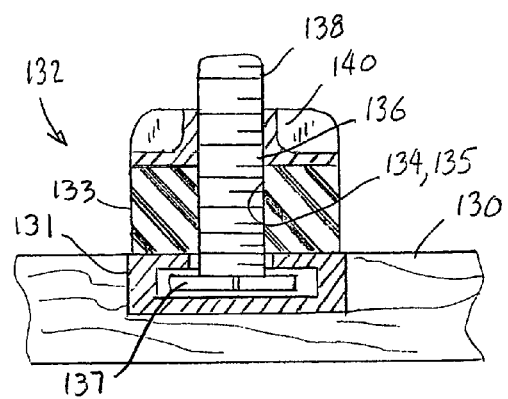
FIG. 25 is a fragmentary transverse sectional view through the hold-down block of FIG. 24 and an associated portion of the stand-off panel and channel that carries the hold-down block.
Figure 26:
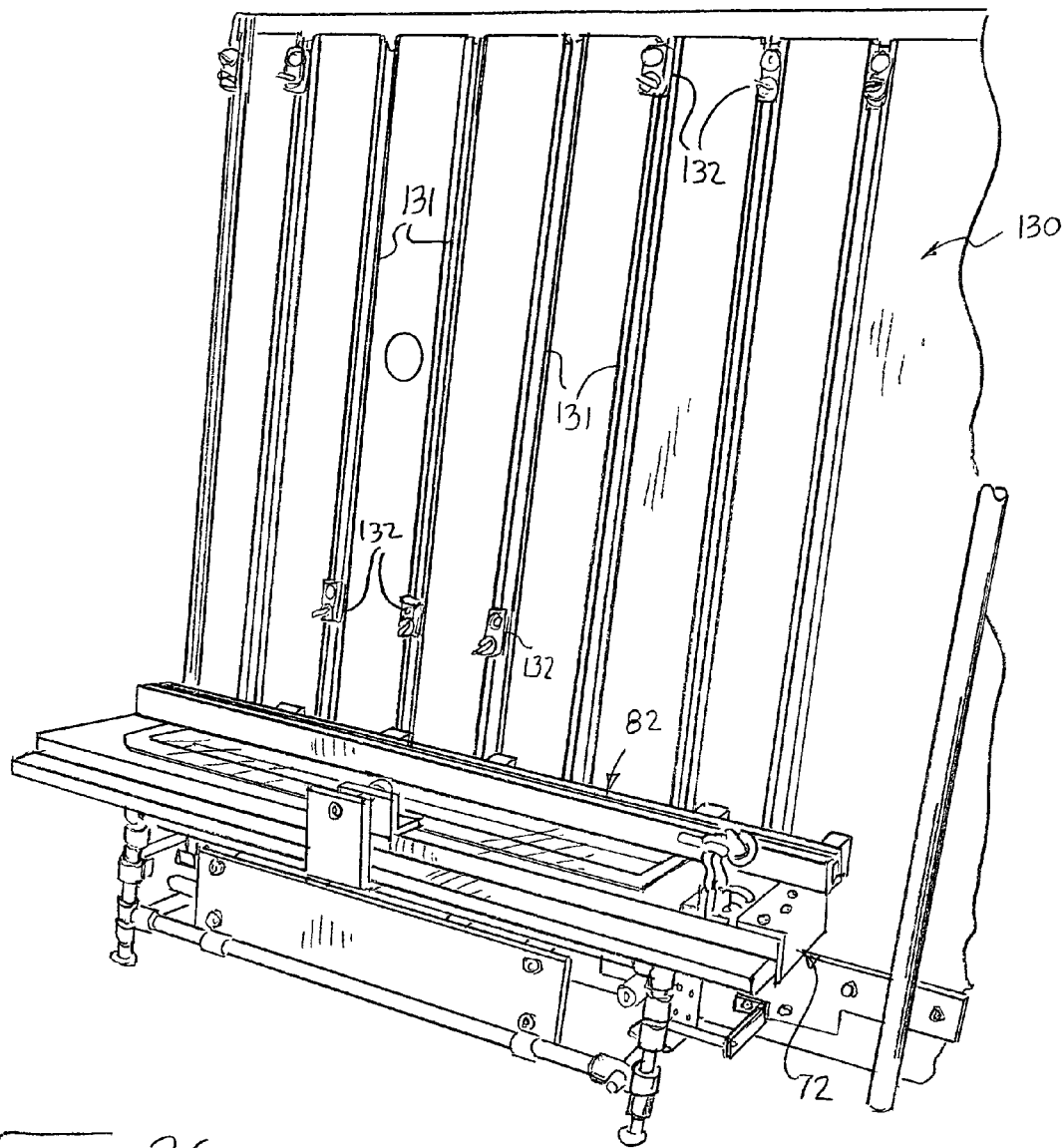
FIG. 26 is a fragmentary front perspective view of one end of a panel saw having a stand-off panel according to the invention supported on the face of the panel saw frame, with a movable edge stop assembly mounted on a supplemental frame according to the invention.

(4) The edge stop assembly 72 includes a movable panel that enables all the edge stops to be moved as a unit toward or away from the workpiece;

(5) A heavy duty edge stop 90 may be positioned in overlying relationship to a light duty edge stop 102 to render the light duty edge stop inoperative and place the heavy duty edge stop in service without requiring removal of the light duty edge stop from the assembly (see FIGS. 19 and 20).

(6) A removable stand-off panel 130 (see FIGS. 17 and 23-29) is provided for placement on the front of one or both of the wings, to locate thin workpieces more forwardly on the panel saw frame and position them closer to the tool;

(7) Channel members 131 are embedded in the face of the stand-off panel for adjustably supporting hold-downs 132 to engage the upper edge of the workpiece and hold it down on the rollers; and (8) Manual and/or spring loaded rise limiters are mounted on the tool mounting plate for engaging the workpiece and holding it in position back against the panel saw frame while it is being cut.

As seen best in FIGS. 2, 3 and 4, the supplemental frame assembly 70 comprises a longitudinally extending bottom frame member 74 connected between the lower ends of vertical frame members 75 and 76 that are positioned near the ends of and spaced outwardly from a respective wing of the panel saw frame 51, and a top frame member 77 connected between the upper ends of the vertical frame members 75 and 76. A first pair of connectors 78 extend from the upper ends of the vertical frame members to an adjustable connection with the guide plate 61, and a second pair of connectors 79 extend from the lower ends of the vertical frame members to a bracket mounted on the lower front edge of the base panel 60 of the panel saw frame 51. The supplemental frame member is horizontally and vertically adjustable to enable it to be squared up and matched to the exact position of the panel saw frame. First quick release mounting means is formed on the upper ends of the vertical frame members by stubs 80 extending upwardly beyond the top frame member 77. The stubs engage in a second quick release mounting means defined by a socket on the underside of the edge stop assemblies to support the assemblies as described more fully hereinafter.

A first removable edge stop assembly 71 is shown in FIGS. 2 and 21-23. As shown in FIG. 2 the edge stop assembly 71 is supported on the upper ends of the vertical frame members 75 and 76 in close proximity to the front of the panel saw frame and extends from the outer end of the respective wing to adjacent the respective tool carriage guide rods. The edge stop assembly 71 comprises an edge stop support means on which a plurality of edges stops is supported. In this form of the invention the edge stop support means comprises a base or bottom panel 81 that is supported on the supplemental frame as described below. A double-rail guide channel 82 is mounted on top of the base panel, and one or more pivoting heavy duty edge stops 90 are mounted on the guide channel for adjustable positioning along its length. The heavy duty stops 90 are available from Maya Positioning Equipment Mfg. Co. Inc., P.O. Box 207, Reinhold, Pa. 17569 under the name Flip-Up Posi-Stop Unit, F-06-R or EF-06R. A gravity action swing stop Posi-Stop Unit also is available from Maya under number SW-01-D. Although the specific stops mentioned are preferred, other comparable stops could be used. Since the edge stops 90 are commercially available they will not be described in detail herein, but it should be noted that the stops comprise a first pair of inverted U-shaped base members 90A that straddle and slide along the guide rail more remote from the workpiece, and a second pair of inverted U-shaped members 90B pivotally attached to the first pair by a pivot pin so that the second pair can be pivoted up out of the way or down over the guide rail spaced closest to the workpiece. One or more stop arms 90C are carried by the second pair of members to be manually moved into and out of position behind the trailing edge of a workpiece to hold the workpiece in a predetermined forward position relative to the cutting tool. The edge stops can be slid along the guide rails and locked in desired positions by turning the clamping lever 91.

Figure 5:
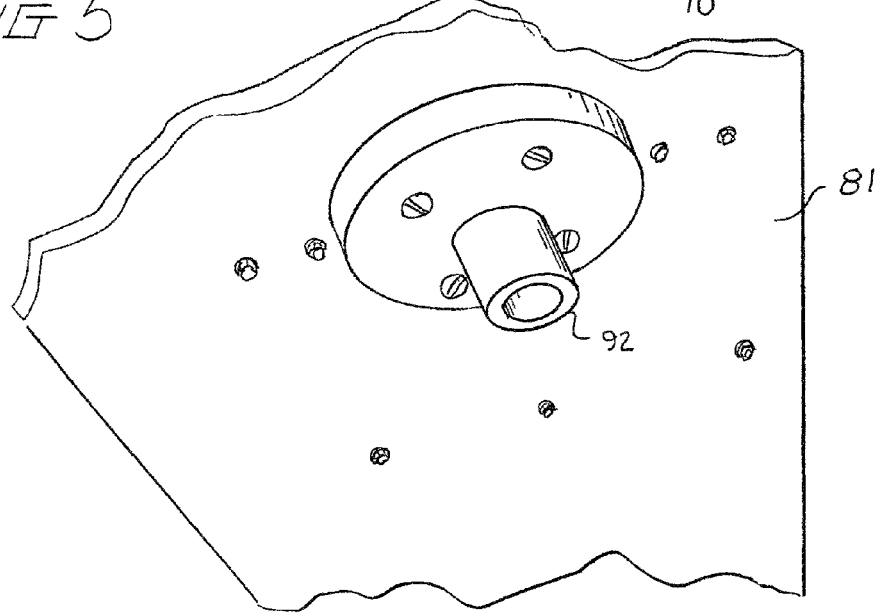
FIG. 5 is an enlarged fragmentary bottom perspective view of a lower end portion of the edge stop assembly of FIG. 2, showing the socket that receives the stub support on the supplemental frame to releasably hold the edge stop assembly to the supplemental frame.

A mounting socket 92 (see FIG. 5) is attached to the bottom of the base panel 81 adjacent each end thereof and forms a second quick release mounting means. When the edge stop assembly 71 is mounted to the panel saw, the stubs 80 on the supplemental frame insert into these sockets to releasably support the edge stop assembly in position. Although not shown, when lightweight workpieces are being handled and it is desired to use a stationary edge stop assembly platform such as 71, the heavy duty edge stops can be removed and lighter duty edge stops 102 (see FIGS. 6 and 7) substituted on the guide rails of the assembly 71.

Figure 7:
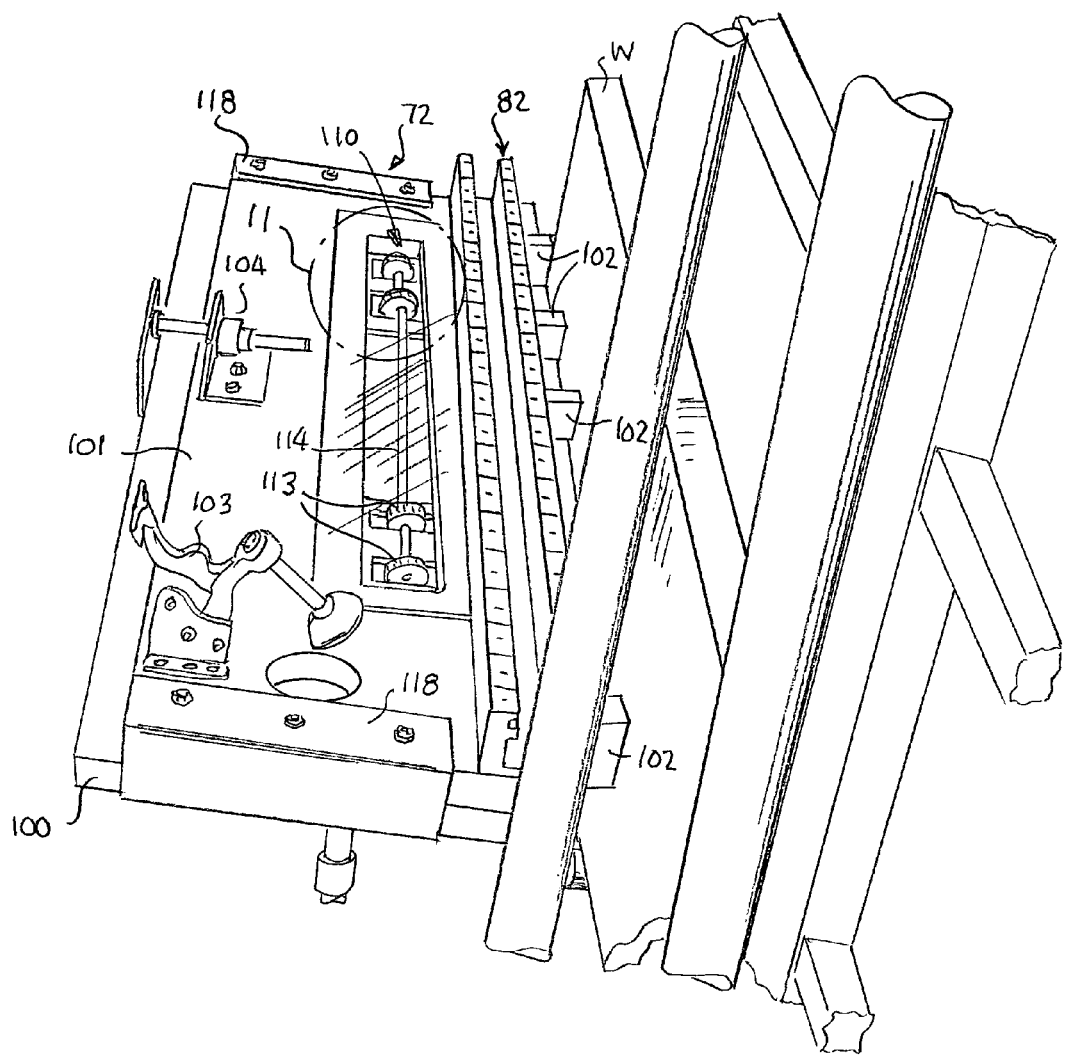
FIG. 7 is a view similar to FIG. 6, but showing the movable plate in a forward position close to the workpiece, rendering the edge stops operative, and showing the locking mechanism in a released position.
Figure 8:
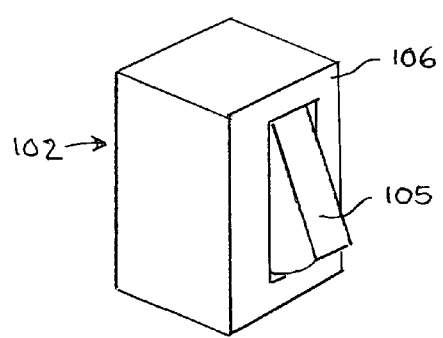
FIG. 8 is a perspective view of a light duty edge stop as used in the present invention.
Figure 9:
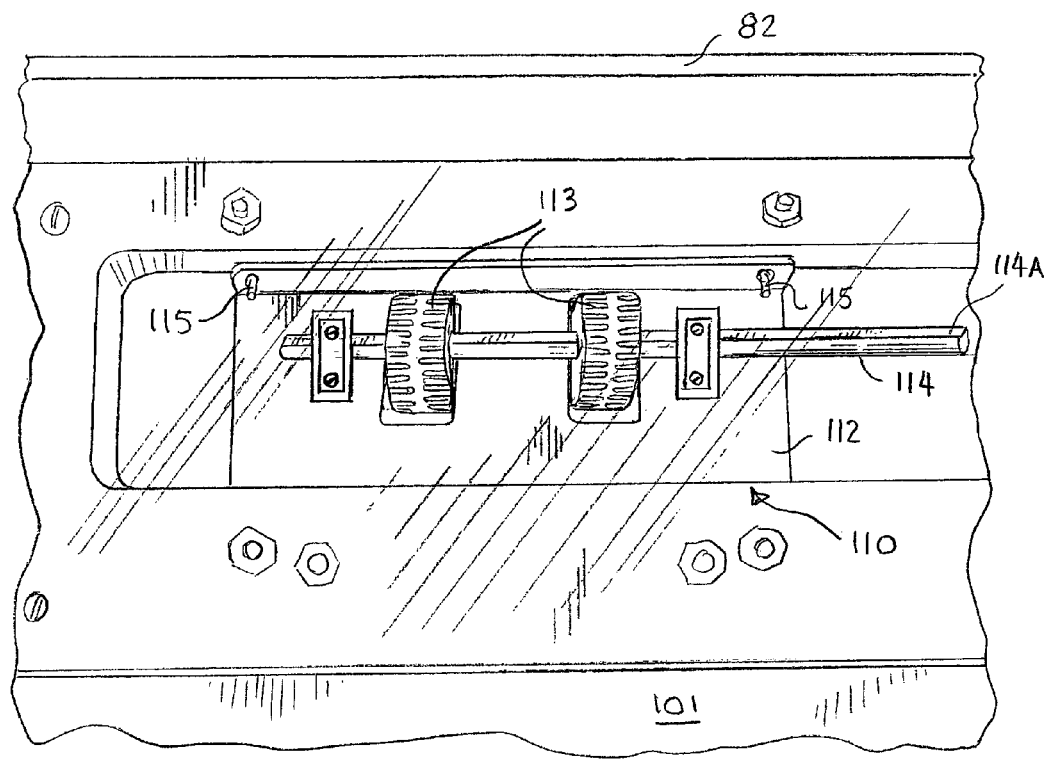
FIG. 9 is a greatly enlarged fragmentary top view of that portion of the edge stop assembly in the circled area 11 in FIG. 7.
Figure 15:
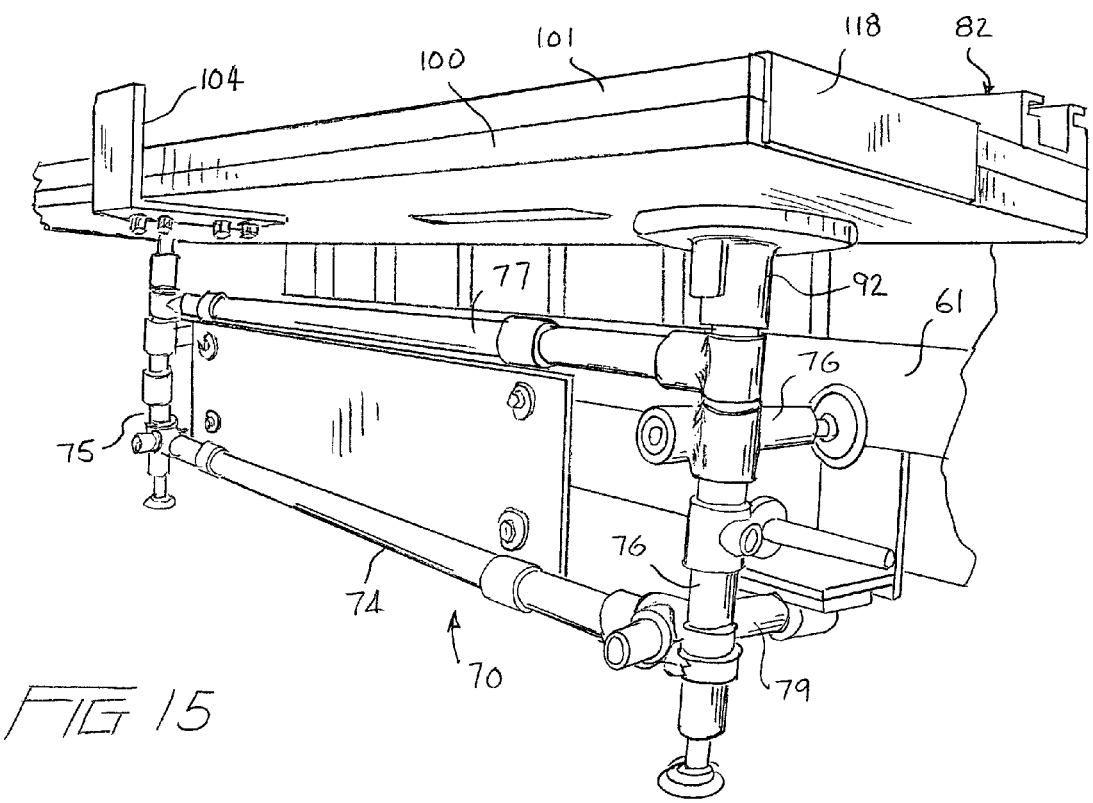
FIG. 15 is a bottom perspective view of the movable edge stop assembly of FIGS. 6 and 7, showing details of the supplemental frame and how the edge stop assembly is supported on the frame.
Figure 16:
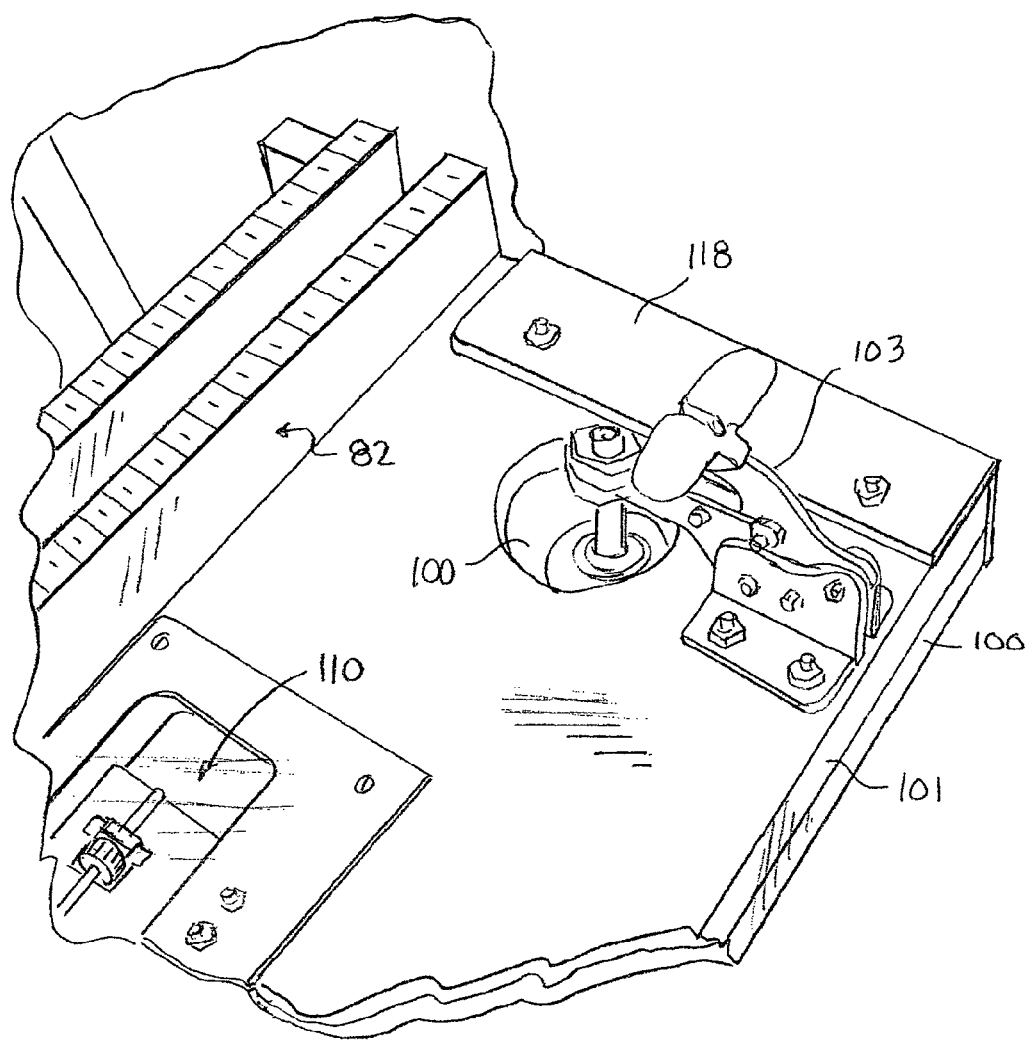
FIG. 16 is a fragmentary top perspective view of one end of the movable edge stop assembly of FIGS. 6 and 7, showing the locking mechanism in position to lock the top panel against movement relative to the bottom panel, and with the top panel in a retracted position to render the edge stops inoperative.
Figure 17:
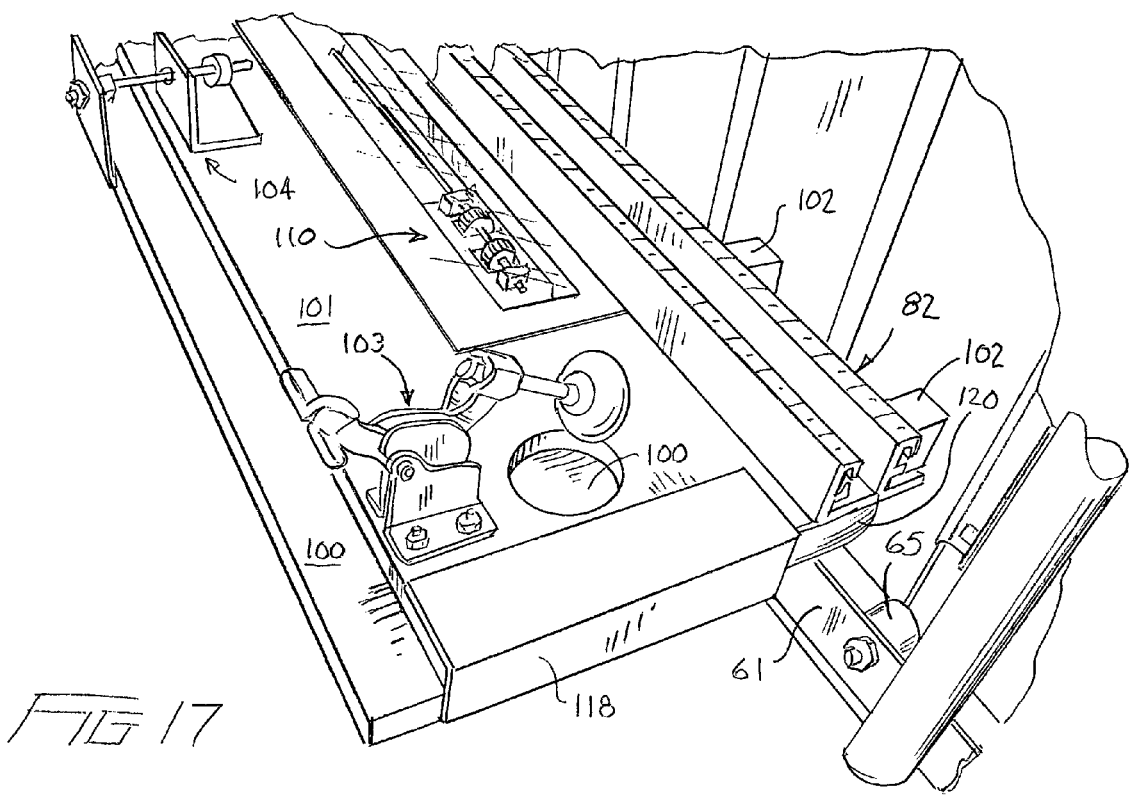
FIG. 17 is a fragmentary top perspective view of one end of the movable edge stop assembly of FIGS. 6 and 7, showing the locking mechanism in unlocked position and with the top panel in a released forward position to render the edge stops operative.
Figure 18:
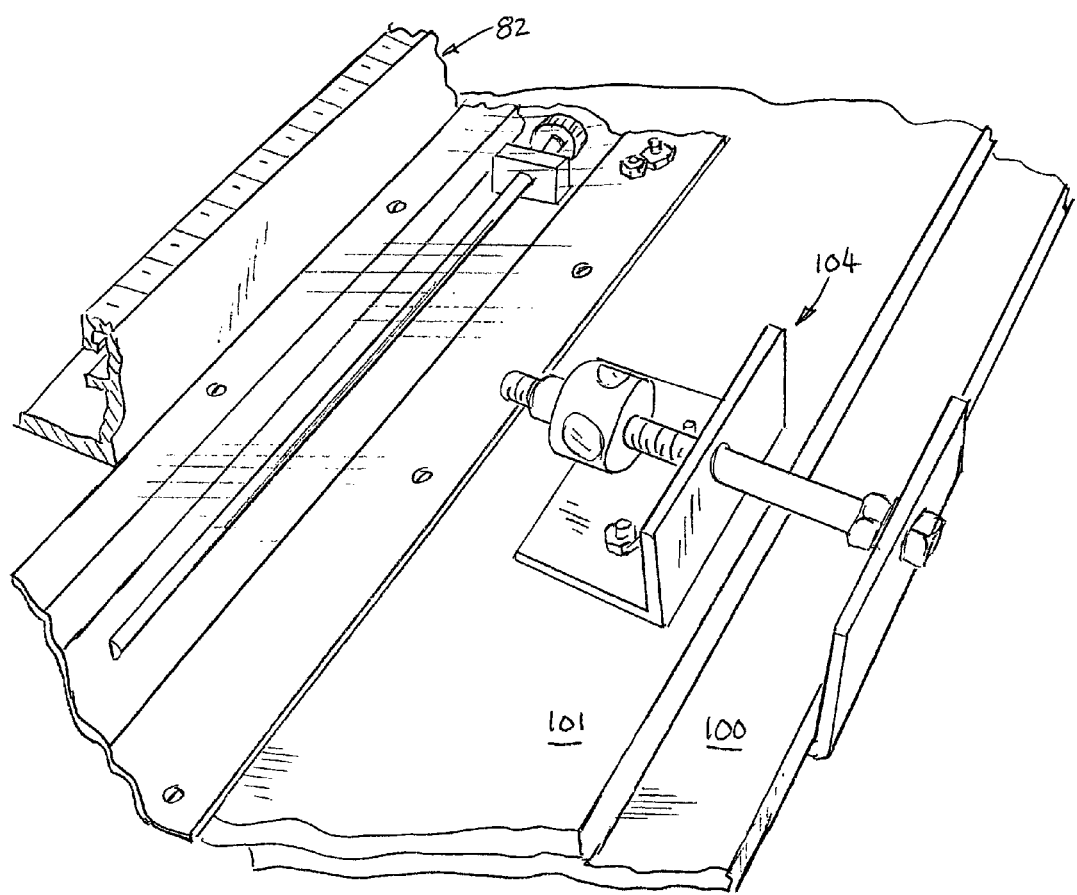
FIG. 18 is an enlarged, fragmentary top perspective view of a portion of the edge stop assembly of FIGS. 6 and 7, showing an adjustable stop that can be set to limit the extent of movement of the top panel toward the panel saw and that also can be grasped to pull the top panel rearwardly into an inoperative position.

A movable quick-set edge stop assembly 72 is shown in FIGS. 6 and 7. The assembly 72 comprises an edge stop support on which a plurality of edges stops is supported. In this form of the invention the edge stop support means comprises a base or lower panel 100 and an upper panel 101 movably mounted on the lower panel. A socket 92 (see FIGS. 5 and 15) is attached to the underside of the lower panel adjacent each of its opposite ends and comprise second quick release mounting means for mounting the edge stop assembly on the stubs 80 of the supplemental frame. The upper panel 101 of the edge stop support means is slidably mounted on top of the lower panel and a double rail guide channel 82 is mounted on top of the upper panel at its forward edge. A plurality of light duty edge stops 102 is adjustably carried on the guide channel, and a locking mechanism 103 is carried by the upper panel and movable into and out of engagement with the lower panel for locking the upper panel 101 in adjusted position on the lower panel 100. An adjustable stop 104 is mounted to a rear edge of the upper and lower panels to limit forward movement of the upper panel and its associated edge stops toward the panel saw when the locking mechanism is released. The light duty edge stops are preferably spring or gravity biased to an outward operative position, and are commercially available from Scotchman Industries, 180 East Highway 14, Philip, S.Dak. 57567 under the name Multi-Loc Stop System, Part 029160, RHE M-L. Accordingly, the edge stops will not be described in detail herein. However, it is noted that the edge stops 102 each has a stop arm 105 that normally is biased outwardly of the edge stop housing 106. In use, the upper panel 101 is locked in a retracted position as shown in FIG. 6 and a workpiece is placed in the panel saw, resting at its bottom edge on the support rollers 65. The locking mechanism is then released, permitting the upper panel and its associated edge stops to slide forwardly to rest against or in close proximity with the workpiece as shown in FIG. 7. Preferably, the locking mechanism is again engaged to lock the upper panel and associated edge stops in their forward, operative position. The adjustable stop also preferably is adjusted so that it provides a positive stop for the forward movement of the upper panel just as it reaches the workpiece, or just short of engagement therewith. The workpiece pushes the stop arms 105 into their respective housings, and as the workpiece is slid longitudinally along the panel saw frame the stop arms automatically move to their outer position behind the trailing edge of the workpiece as the workpiece passes that edge stop. The locations of the edge stops along the guide rail can be adjusted to engage the trailing edge of the workpiece as it is moved longitudinally of the panel saw to perform operations on the workpiece at one or more predetermined locations along its length.

Figure 10:
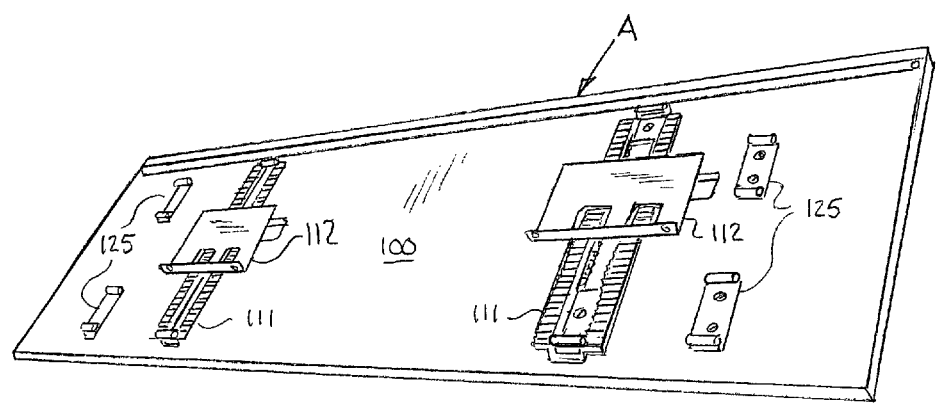
FIG. 10 is a top perspective view of the bottom panel of the movable edge stop assembly of FIGS. 6 and 7, showing the roller slides and mounting plates for attaching the movable top panel of the edge stop assembly.
Figure 11:
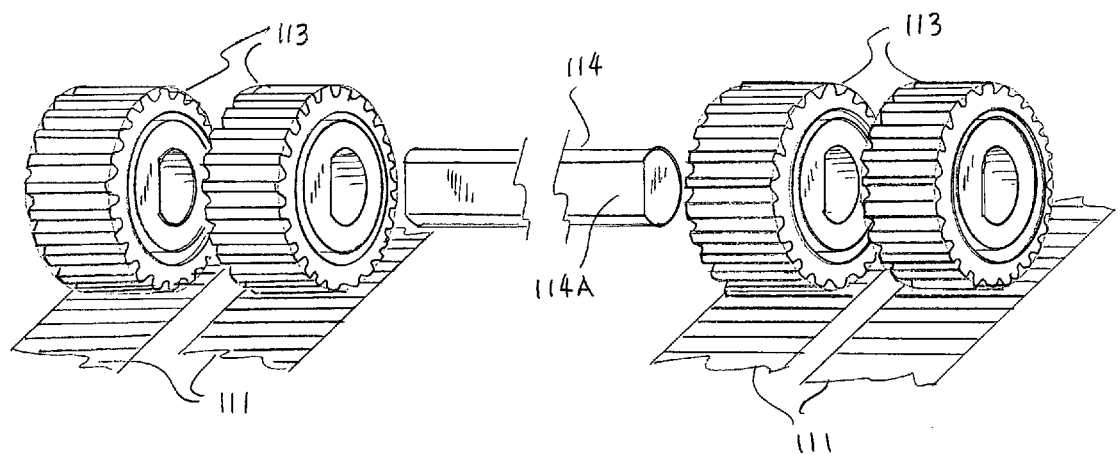
FIG. 11 is a somewhat schematic fragmentary exploded view of the roller wheels, tracks, and connecting shaft of the roller slide assembly of FIGS. 9 and 10.

Accurate movement of the upper panel of the movable edge stop assembly 72 relative to the lower panel is accomplished by use of a roller slide mechanism 110 (see FIGS. 9-14). With reference to FIG. 10, the roller slide mechanism comprises pairs of toothed roller tracks 111 attached to the upper surface of the lower panel 100 adjacent its opposite ends, a slide plate 112 attached to the underside of the upper panel 101 adjacent its opposite ends in positions to be centered above the roller tracks when the upper panel is operatively positioned on the lower panel, toothed rollers 113 carried on a shaft 114 mounted to the slide plates so that the rollers are in aligned registry with openings through the slide plates so the rollers engage the tracks, and said shaft having a flattened indexing side 114A to constrain the rollers to rotate together to prevent cocking of the upper panel as it moves relative to the lower panel. Aligning pins 115 on the upper panel are engaged in openings 116 through an upright flange 117 on each of the slide plates to properly align the upper panel with the lower panel when they are assembled together, and L-shaped guide flanges 118 are attached to the opposite ends of the upper panel to help prevent lateral side-to-side movement of the upper panel relative to the lower panel.

Figure 12:
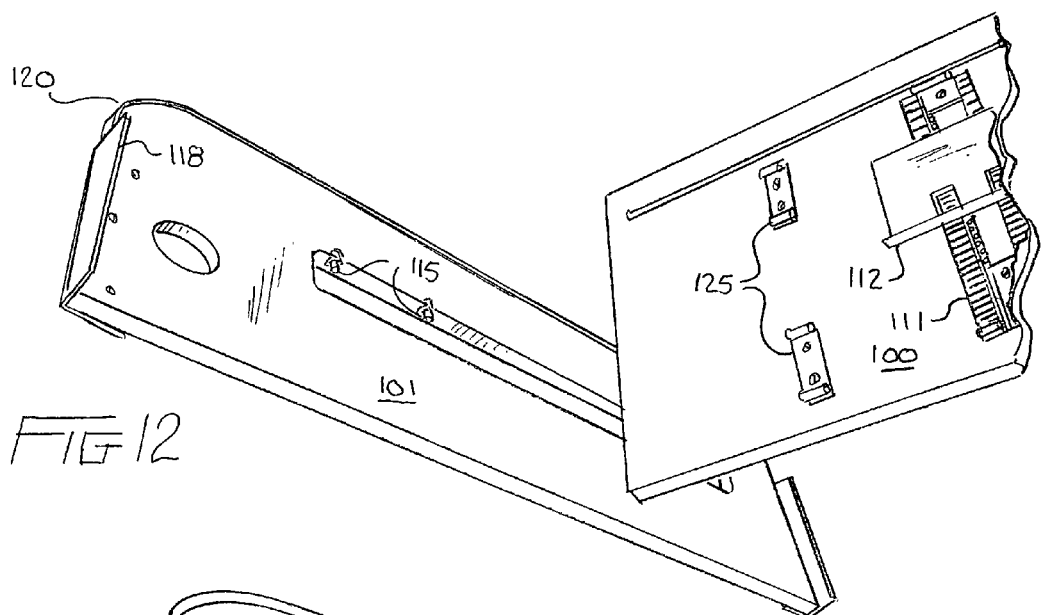
FIG. 12 is an exploded fragmentary perspective view showing the top of one end of the bottom panel of FIG. 10 and the underside of an associated top panel.
Figure 13:
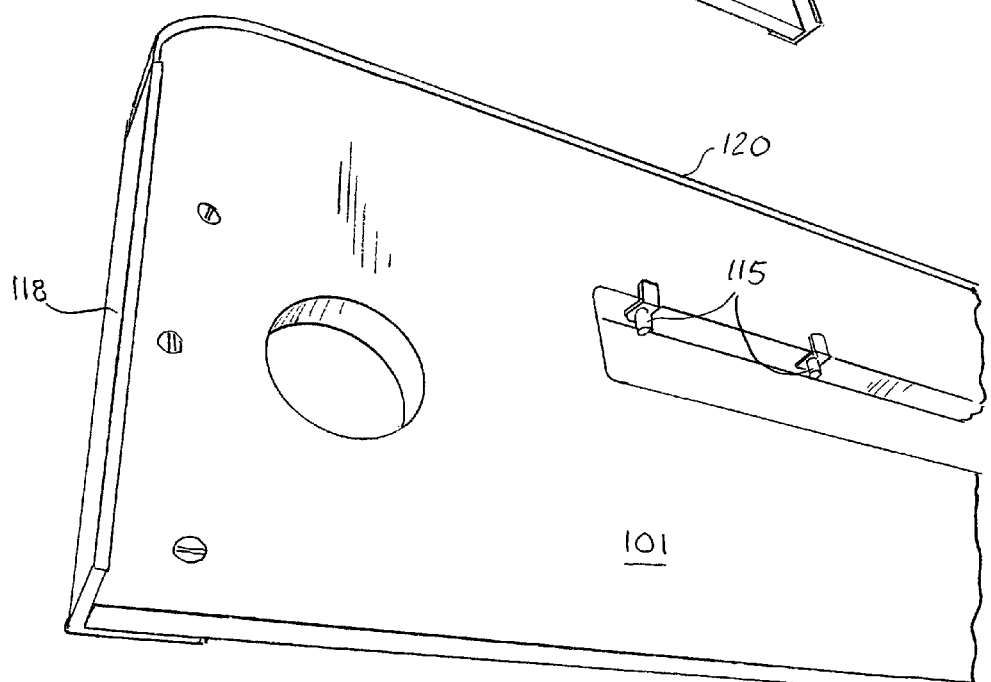
FIG. 13 is an enlarged, fragmentary, bottom perspective view of the top panel of FIG. 12, showing details of the pins that engage the roller slide plate of the roller slide assembly.
Figure 14:
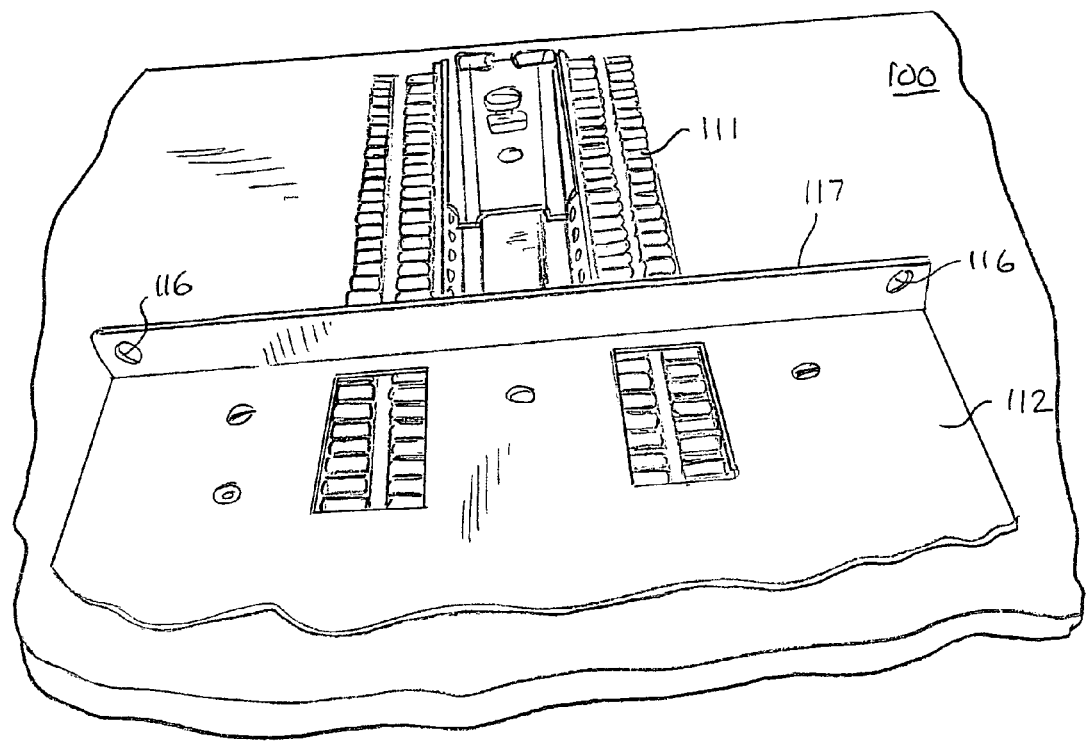
FIG. 14 is a greatly enlarged, fragmentary, top perspective view of a portion of one of the roller slide assemblies, looking in the direction of the arrow A in FIG. 10 and showing details of the roller slide plate.

Since the lower panel remains spaced from a workpiece when the edge stop assembly 72 is in operative position on the supplemental frame, but the upper panel moves to a position very close to the workpiece or in engagement therewith when it is in operative position, a protective strip 120 may be applied to the edge of the upper panel that faces the workpiece (see FIG. 12). In a preferred embodiment the protective strip may comprise leather.

Additional support to the upper panel may be provided by small roller assemblies 125 mounted to the upper surface of the bottom panel near its opposite ends (see FIG. 10).

The edge stops normally carried by the upper panel 101 in the edge stop assembly 72 comprise light duty edge stops 102. Heavy duty edge stops 90' may be quickly and easily substituted for the light duty edge stops simply by placing a heavy duty edge stop over the light duty edge stop as depicted in FIGS. 19 and 20. When this is done, the top panel is retracted to a position where the light duty edge stops are spaced sufficiently from the workpiece that they will not contact the workpiece, but the longer stop arm of the heavy duty edge stop is still able to engage the trailing edge of the workpiece. It will be noted that the heavy duty edge stops 90' in this embodiment differ from the heavy duty edge stops 90 in the embodiment shown in FIGS. 21-23. The edge stops 90' have a first set of inverted U-shaped base members 90A' similar to the base members 90A in the FIGS. 21-23 embodiment, but the second set 90B is omitted. Also, the stop arm 90C' is slightly differently configured than stop arm 90C in the previous embodiment.

As seen best in FIGS. 24-28, stand-off panels 130 can be positioned on the front of the wings of the panel saw frame 51 to position thin workpieces more forwardly on the panel saw and closer to the tool. The stand-off panels preferably have a thickness of about ½ inch, and can include a plurality of vertically extending channels 131 recessed into the front face thereof for carrying one or more hold-downs 132 that are movable along the channels to engage the upper edge of a workpiece to hold it down on the rollers. The hold-downs 132 are seen best in FIGS. 24 and 25, and comprise a rectangular block 133 having a pair of holes 134 and 135 extending therethrough from the front face to the back face, with a threaded bolt 136 extending through each opening. Both bolts have a head 137 slidable in the channel 131 and a threaded end 138 protruding through the face of the block. One of the bolts has a nut 139 threaded on its outer end to hold the bolt in place, and the other bolt has a wing nut or other suitable easily manipulated fastener 140 threaded on its outer end for drawing the head 137 against the flanges of the channel to lock the hold-down in place on the channel.

Figure 27:
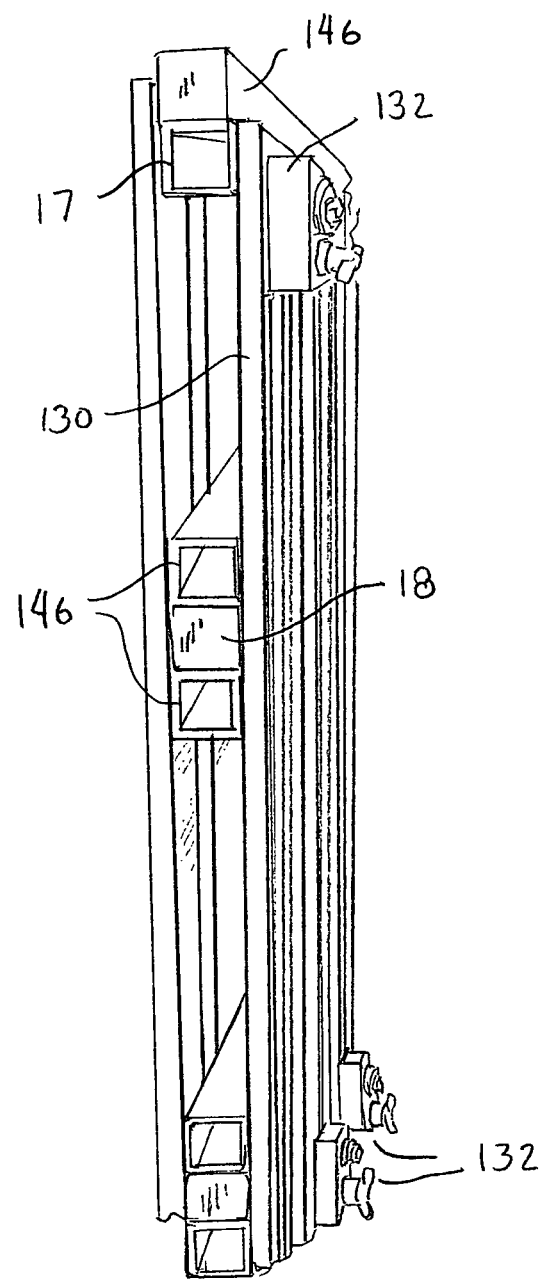
FIG. 27 is an enlarged fragmentary end view of the panel saw and stand-off panel of FIG. 26.
Figure 28:
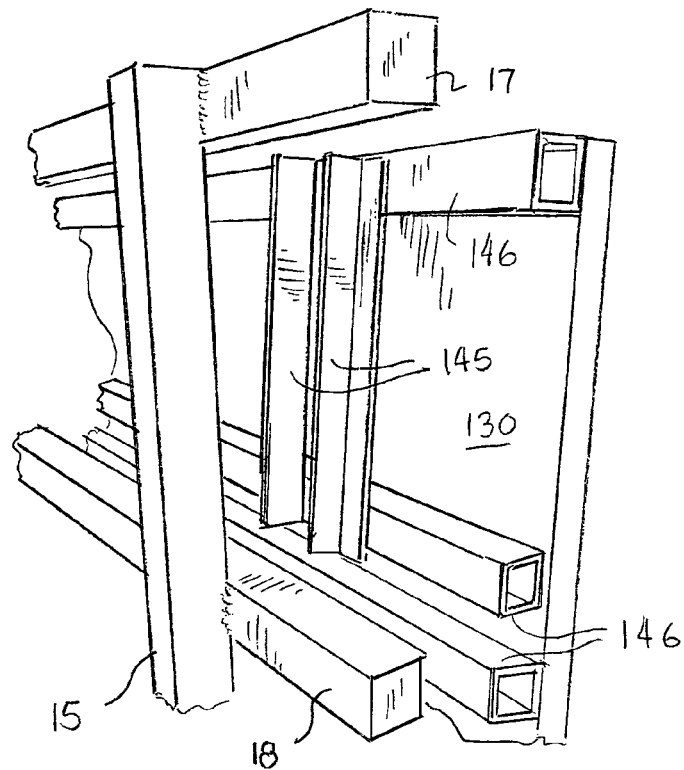
FIG. 28 is an enlarged, exploded, fragmentary rear perspective view of an end portion of the panel saw frame of FIG. 26, depicting the stand-off panel separated from the panel saw frame and showing the structure on the rear of the stand-off panel that fits with the structure of the panel saw frame to position and hold the stand-off panel in position.
Figure 29:
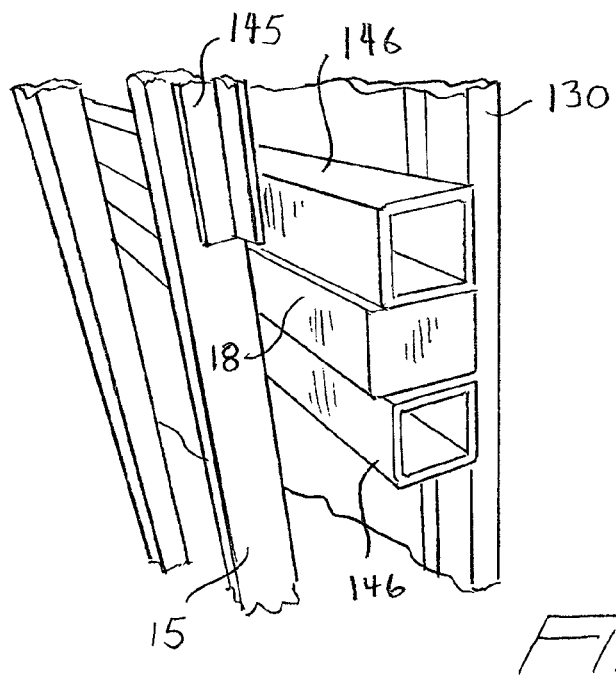
FIG. 29 is a fragmentary rear perspective view of the panel saw frame and stand-off panel of FIG. 28, showing the stand-off panel assembled to the panel saw frame and illustrating how the structures fit together.
Figure 33:
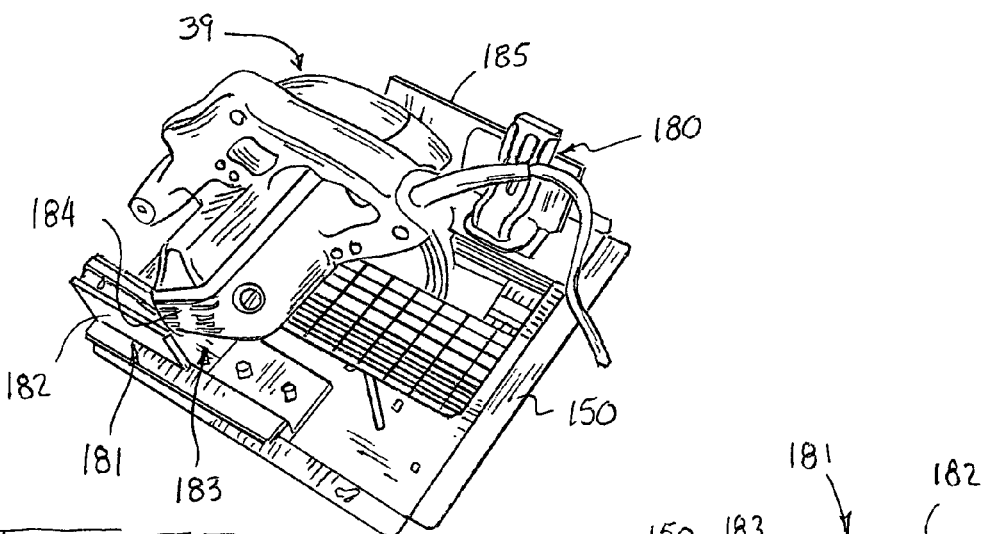
FIG. 33 is a top perspective view of a tool mounting plate and circular saw mounted thereon, with manually operated rise limiters, showing the rise limiter to the right of the tool in a retracted position.
Figure 34:
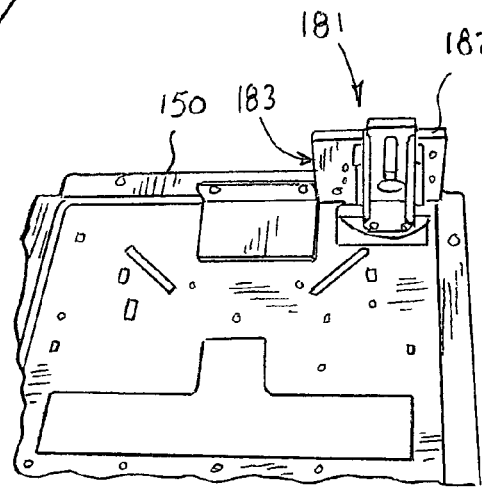
FIG. 34 is a fragmentary top perspective of one side of the tool mounting plate of FIG. 33, with the tool removed, and showing the manual rise limiter that is positioned on the blade side of the tool.
Figure 35:
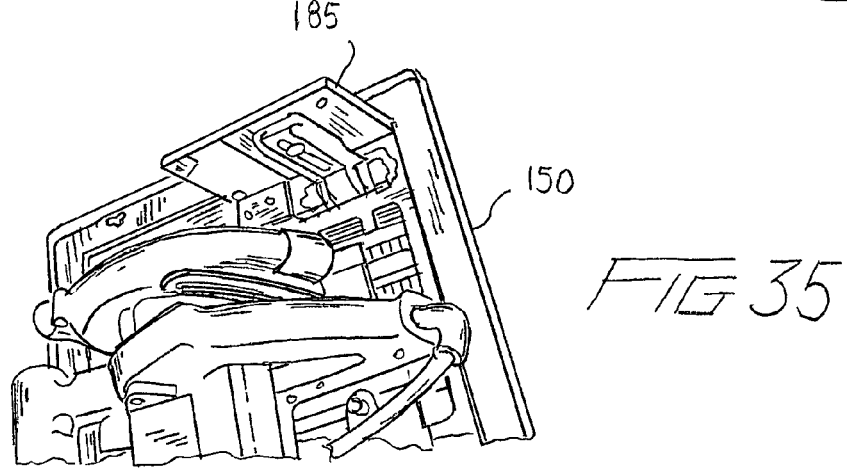
FIG. 35 is a fragmentary top perspective view of the assembly of FIG. 33, showing the rise limiter in an extended, operative position.
Figure 36:
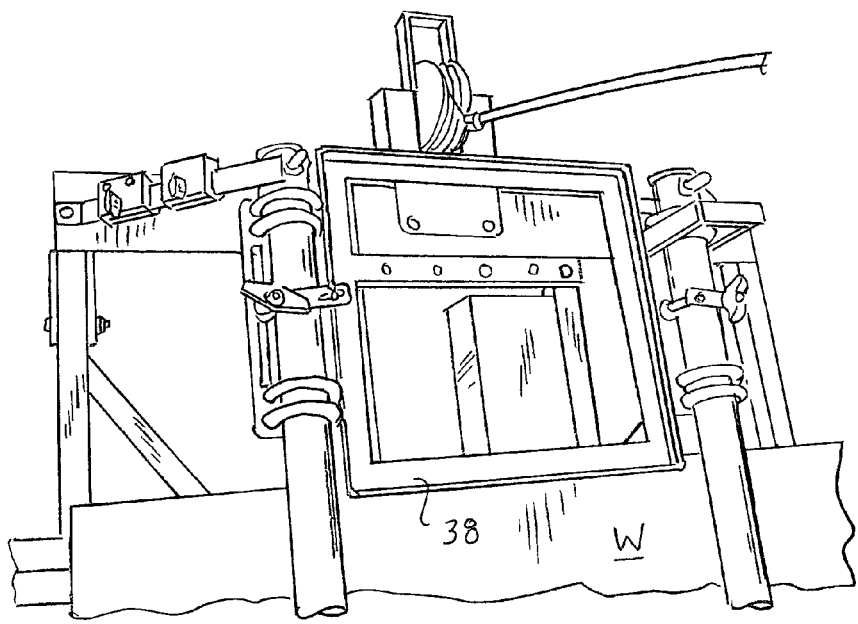
FIG. 36 is a fragmentary front perspective view of the tool carriage and associated slides, with the tool mounting plate and tool removed from the carriage.
Figure 37:
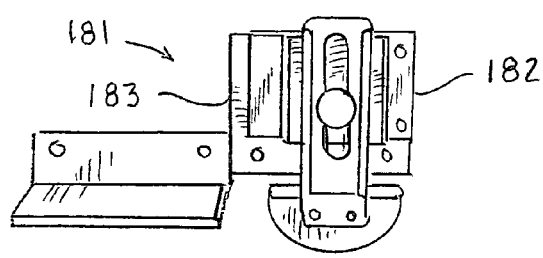
FIG. 37 is a side view in elevation of one of the rise limiters of FIGS. 33-35, shown removed from the mounting plate and looking from the side that would face the tool when in use.
Figure 38:
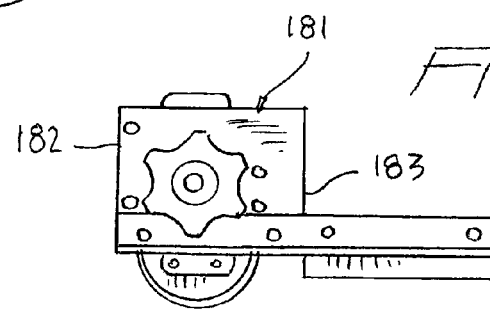
FIG. 38 is a side view in elevation of the rise limiter of FIG. 37, looking from the side that would face away from the tool when in use.

With particular reference to FIGS. 27-29, vertically extending angle members 145 are attached to the rear surface of the stand-off panel in positions to engage on opposite sides of the vertical frame members 15 of the panel saw, and spaced apart horizontally extending bars 146 are affixed to the rear surface of the stand-off panel in positions to engage above and below the horizontal frame members 17, 18, 19 of the panel saw. The angle members and bars accurately and securely hold the stand-off panel in position on the panel saw frame.

The rise limiters and modified tool mounting plate of the invention are seen best in FIGS. 30-38. The tool mounting plate 150 is a flat rectangular plate that is removably mounted to the tool carriage 38 that slides on the guide rods 36 and 37. It has various openings therein for mounting different tools, and in the invention at least one and preferably a plurality of rise limiters 151 are carried by the mounting plate for engaging the workpiece to hold it against the panel saw frame, or against the stand-off panels when they are used. In FIGS. 31-35, the mounting plate is shown removed from the tool carriage 38.

A first type of rise limiter is shown in FIG. 30, and comprises at least one, and in the embodiment shown, two spring biased wheels or rollers 161 and 162 carried by an L-shaped bracket 163 attached to the mounting plate 150. The rollers project through an opening 164 in the mounting plate and press against a workpiece positioned on the panel saw to hold the workpiece against the panel saw frame and prevent undesired movement or "chatter" of the workpiece as it is being operated on by the tool.

A second type of rise limiter is shown in FIGS. 31 and 32, wherein a spring loaded roller 171 is carried by the mounting plate 150 on one side of the tool (saw 39 in the example shown), and a pair of manually adjustable rise limiter slides 172 and 173 are carried by the mounting plate on the other side of the tool, with one of the slides 172 positioned to engage the workpiece in advance of the tool and the other slide 173 positioned to engage the workpiece following contact by the tool. The slides 172 and 173 project through respective openings 174, 175 in the mounting plate, and are carried by brackets 176 attached to the top of the mounting plate so that the slides can be clamped in different adjusted positions relative to a workpiece to accommodate workpieces of different thickness, i.e., the slides should bear against the workpiece with just sufficient pressure to prevent movement of the workpiece, but not to impede sliding movement of the hold down on the workpiece. In this regard, the slides preferably are made of neoprene, plastic or other suitable material to facilitate sliding movement of the slides against the workpiece and prevent marring of the workpiece by the slides.

A third type of rise limiter is shown in FIGS. 33-35, 37 and 38, wherein a pair of manually adjustable slides 180 and 181 are attached to the mounting plate 150 on opposite sides of the tool 39, with one of the slides 180 positioned to engage the workpiece in advance of the tool, and the other slide 181 positioned to engage the workpiece following the tool. It will be noted that a portion of the bracket 182 supporting the slide 181 is recessed at 183 to avoid interference with the cooling vent 184 for the tool. Bracket 185 for slide 180 need not be recessed.

It will be noted that the edge stops, hold-downs, and rise limiters engage and support the workpiece along three mutually perpendicular axes, i.e. on the trailing edge, on the top edge, and on the front face, to securely hold the workpiece in position on the panel saw.

Although particular embodiments of the invention are illustrated and described in detail herein, it is to be understood that various changes and modifications may be made to the invention without departing from the spirit and intent of the invention as defined by the scope of the appended claims.

What is claimed is:

1. In a panel saw having a frame comprising a plurality of generally horizontal frame members and a plurality of generally vertical frame members defining a generally upright and rearwardly inclined planar guide and support surface for supporting large workpieces on one edge thereof in a generally upright position, said generally horizontal frame members extending in a length direction of the panel saw, and tool guide means for supporting a cutting tool for movement along a face of the frame transverse to the length direction to perform cutting operations on a workpiece supported and guided on the panel saw frame, the improvement comprising:
   a supplemental frame mounted to a front lower edge of the panel saw frame, said supplemental frame having first quick release mounting means on an upper end thereof; and
   an edge stop assembly removably mounted on an upper end of said supplemental frame assembly, said edge stop assembly comprising:
      edge stop support means extending in the length direction of the panel saw in closely outwardly spaced relationship to the guide and support surface of the panel saw and upwardly spaced from a lower edge thereof;
      second quick release mounting means on an underside of said edge stop support means cooperatively engaged with said first quick release mounting means;
      elongate guide channel means mounted on the edge stop support means and extending in the length direction of the panel saw; and
      edge stop means carried by the guide channel means for engaging an edge of a workpiece supported on the panel saw to locate the workpiece in a measured length direction relative to the cutting tool, said edge stop means including movable stop means having a first position out of the way of the workpiece and a second position engageable with an edge of the workpiece, said edge stop means being adjustable along the length of the guide channel means and releasably attached to it so that different edge stop means can be quickly and easily substituted on the supplemental frame assembly.

2. A panel saw as claimed in claim 1, wherein:
said edge stop support means comprises a base panel having said edge stop means supported on an upper surface thereof and said second quick release mounting means on an underside thereof.

3. A panel saw as claimed in claim 2, wherein:
said first quick release mounting means comprises an upwardly extending stub on the upper end of said supplemental frame at each of opposite ends thereof; and
said second quick release mounting means comprises a downwardly open socket on an underside of each end of said base panel.

4. A panel saw as claimed in claim 1, wherein:
said edge stop support means comprises a lower panel and an upper panel slidably mounted on said lower panel for movement toward and away from said panel saw, said edge stop means being supported on an upper surface of said upper panel, and said second quick release means being mounted on an underside of said lower panel.

5. A panel saw as claimed in claim 2, wherein:
said guide channel means comprises a pair of closely spaced guide rails; and
said edge stop means comprises heavy duty edge stops having an inverted U-shaped base member slidable on a first of said rails, and an edge stop arm mounted to said base member and pivotable between a first position away from a workpiece and a second position engageable with said workpiece.

6. A panel saw as claimed in claim 5, wherein:
a second inverted U-shaped member is pivotally mounted to said base member, and said edge stop arm is fixed to said second U-shaped member, said second U-shaped member engaged over a second of said spaced guide rails when the edge stop arm is in its second position, said second guide rail being spaced between said first guide rail and a workpiece.

7. A panel saw as claimed in claim 1, wherein:
said edge stop support means comprises a lower panel and an upper panel slidably mounted on said lower panel for movement toward and away from a workpiece supported on said panel saw.

8. A panel saw as claimed in claim 7, wherein:
said edge stop means comprises a light duty edge stop means having a housing positionable along the guide channel means, and a stop arm that automatically deploys from the housing to engage the edge of a workpiece when the workpiece is advanced past the housing.

9. A panel saw as claimed in claim 1, wherein:
a stand-off panel is removably positioned on a front face of the panel saw frame to support, guide, and locate a workpiece in a direction closer to the cutting tool to prevent movement of the workpiece in a direction perpendicular to said generally planar guide and support surface when the cutting tool is being operated.

10. A panel saw as claimed in claim 9, wherein:
said stand-off panel has length and width dimensions substantially commensurate with length and width dimensions of said generally planar guide and support surface;
vertically extending guide channels are recessed into a face of the stand-off panel oriented toward an operator; and
adjustable hold-down means are carried by the guide channels for engaging an upper edge of the workpiece to hold it down on the panel saw.

11. A panel saw as claimed in claim 1, wherein:
said cutting tool includes a tool carriage slidable on said tool guide means, a tool mounting plate releasably carried by the tool carriage, and workpiece rise limiters carried by the mounting plate for engaging the workpiece and pressing it against the generally planar guide and support surface to prevent movement of the workpiece in a direction perpendicular to the generally planar guide and support surface.

12. A panel saw as claimed in claim 6, wherein:
said cutting tool includes a tool carriage slidable on said tool guide means, a tool mounting plate releasably carried by the tool carriage, and workpiece rise limiters carried by the mounting plate for engaging the workpiece and pressing it against the generally planar guide and support surface to prevent movement of the workpiece in a direction perpendicular to the generally planar guide and support surface.

* * * * *